United States Patent
Karamichos

(10) Patent No.: US 12,440,538 B2
(45) Date of Patent: Oct. 14, 2025

(54) TREATMENT FOR OCULAR FIBROSIS

(71) Applicant: UNIVERSITY OF NORTH TEXAS HEALTH SCIENCE CENTER AT FORT WORTH, Fort Worth, TX (US)

(72) Inventor: Dimitrios Karamichos, Carrollton, TX (US)

(73) Assignee: UNIVERSITY OF NORTH TEXAS HEALTH SCIENCE CENTER AT FORT WORTH, Fort Worth, TX (US)

( * ) Notice: Subject to any disclaimer, the term of this patent is extended or adjusted under 35 U.S.C. 154(b) by 0 days.

(21) Appl. No.: 18/853,789

(22) PCT Filed: Apr. 7, 2023

(86) PCT No.: PCT/US2023/017816
§ 371 (c)(1),
(2) Date: Oct. 3, 2024

(87) PCT Pub. No.: WO2023/196555
PCT Pub. Date: Oct. 12, 2023

(65) Prior Publication Data
US 2025/0222067 A1    Jul. 10, 2025

Related U.S. Application Data

(60) Provisional application No. 63/328,826, filed on Apr. 8, 2022.

(51) Int. Cl.
*A61K 38/17*    (2006.01)
*A61K 9/00*     (2006.01)
*A61P 27/02*    (2006.01)

(52) U.S. Cl.
CPC ........ *A61K 38/1709* (2013.01); *A61K 9/0048* (2013.01); *A61P 27/02* (2018.01)

(58) Field of Classification Search
CPC .... A61K 38/1709; A61K 9/0048; A61P 27/02
See application file for complete search history.

(56) References Cited

U.S. PATENT DOCUMENTS

| | | |
|---|---|---|
| 9,714,424 B1 | 7/2017 | Bernstein |
| 10,195,145 B2 | 2/2019 | Niitsu |
| 2003/0153524 A1 | 8/2003 | Hinton |

FOREIGN PATENT DOCUMENTS

| | | |
|---|---|---|
| WO | 2021092187 A1 | 5/2021 |
| WO | 2020009248 A1 | 8/2021 |
| WO | 2023196555 A1 | 10/2023 |

OTHER PUBLICATIONS

Sharif et al., 2018, Pathogenesis of Keratoconus: The intriguing therapeutic potential of Prolactin-inducible protein, Prog Retin Eye Res, 67: 150-167.*
Barrientez, et al. "Corneal injury: Clinical and molecular aspects" Exp Eye Res, 2019. 186: p. 107709.
Blanco-Mezquita, et al. "Role of thrombospondin-1 in repair of penetrating corneal wounds" Invest Ophthalmol Vis Sci, 2013. 54(9): p. 6262-8.
Caputo, et al. "A novel aspartyl proteinase from apocrine epithelia and breast tumors" J Biol Chem, 2000. 275(11): p. 7935-41.
Channa, et al. "Epidemiology of Eye-Related Emergency Department Visits" JAMA Ophthalmol, 2016. 134(3): p. 312-9.
Feizi, S. "Corneal endothelial cell dysfunction: etiologies and management" Ther Adv Ophthalmol, 2018. 10: p. 2515841418815802.
Gote, et al. "Ocular Drug Delivery: Present Innovations and Future Challenges" J Pharmacol Exp Ther, 2019. 370(3): p. 602-624.
Han, et al. "Potential role of corneal epithelial cell-derived exosomes in corneal wound healing and neovascularization" Sci Rep, 2017. 7: p. 40548.
Kalha, et al. Corneal Epithelial Abrasion with Ocular Burr as a Model for Cornea Wound Healing. J Vis Exp, 2018 (137).
Karamichos, et al. "Human corneal fibrosis: an in vitro model" Invest Ophthalmol Vis Sci, 2010. 51(3): p. 1382-8.
Karamichos, et al. Novel in Vitro Model for Keratoconus Disease. J Funct Biomater, 2012. 3(4): p. 760-775.
Longmate, et al. "Integrin Regulation of Epidermal Functions in Wounds" Adv Wound Care (New Rochelle), 2014. 3 (3): p. 229-246.
Matsuba, et al. "Localization of thrombospondin-1 and myofibroblasts during corneal wound repair" Exp Eye Res, 2011. 93(4): p. 534-40.
Medeiros, et al. "The Corneal Basement Membranes and Stromal Fibrosis" Invest Ophthalmol Vis Sci, 2018. 59(10): p. 4044-4053.
Mirels, et al. "Expression of gross cystic disease fluid protein-15/Prolactin-inducible protein in rat salivary glands" J Histochem Cytochem, 1998. 46(9): p. 1061-71.
Naderi, et al. "Prolactin-induced protein mediates cell invasion and regulates integrin signaling in estrogen receptor-negative breast cancer" Breast Cancer Res, 2012. 14(4): p. R111.
Patel, et al. "Ocular drug delivery systems: An overview. World J Pharmacol" 2013. 2(2): p. 47-64.
Phan, et al. "Role of fibronectin and fibrinogen in healing of corneal epithelial scrape wound" Invest Ophthalmol Vis Sci, 1989. 30(3): p. 377-85.
Priyadarsini, et al. "Gross cystic disease fluid protein-15/prolactin-inducible protein as a biomarker for keratoconus disease" PLoS One, 2014. 9(11): p. e113310.
Qazi, et al. "Corneal transparency: genesis, maintenance and dysfunction" Brain Res Bull, 2010. 81(2-3): p. 198-210.
Rao, et al. "Evaluation of myofibroblasts by expression of alpha smooth muscle actin: a marker in fibrosis, dysplasia and carcinoma" J Clin Diagn Res, 2014. 8(4): p. ZC14-7.
(Continued)

*Primary Examiner* — Amber D Steele
(74) *Attorney, Agent, or Firm* — Edwin S. Flores; Daniel J. Chalker; Chalker Flores, LLP

(57) ABSTRACT

The present invention includes methods of treating ocular fibrosis of the eye in a human subject, the method comprising administering to the human subject in need of treatment a therapeutically effective amount of a prolactin-inducible Protein (PIP) which is capable of inhibiting or reversing the ocular fibrosis.

15 Claims, 11 Drawing Sheets

(56) References Cited

OTHER PUBLICATIONS

Reinstein, et al. "Stromal thickness in the normal cornea: three-dimensional display with artemis very high-frequency digital ultrasound" J Refract Surg, 2009. 25(9): p. 776-86.
Ruberti, et al. "Prelude to corneal tissue engineering—gaining control of collagen organization" Prog Retin Eye Res, 2008. 27(5): p. 549-77.
Sharif, et al. "Prolactin-Induced Protein is a novel biomarker for Keratoconus" Exp Eye Res, 2019. 179: p. 55-63.
Sharif, et al. "Pathogenesis of Keratoconus: The Intriguing Therapeutic Potential of Prolactin-Inducible Protein" Prag Retin Eye Res Nov. 2018; vol. 67, pp. 150-167; doi: 10.1016/j.preteyeres.2018.05.002; p. 19, third paragraph.
United States Patent Trademark Office, International Search Report Written Opinion for PCT/US2023/017816 dated Aug. 16, 2023, 7 pp.
Urbaniak, et al. "Prolactin-induced protein (PIP)-characterization and role in breast cancer progression" Am J Cancer Res, 2018. 8(11): p. 2150-2164.
Velnar, et al. "The wound healing process: an overview of the cellular and molecular mechanisms" J Int Med Res, 2009. 37(5): p. 1528-42.
Wilson, et al. "Control of scar tissue formation in the cornea: strategies in clinical and corneal tissue engineering" J Funct Biomater, 2012. 3(3): p. 642-87.
Wilson, et al. "The corneal wound healing response: cytokine-mediated interaction of the epithelium, stroma, and inflammatory cells" Prog Retin Eye Res, 2001. 20(5): p. 625-37.
Yu, et al. "Growth factors and corneal epithelial wound healing" Brain Res Bull, 2010. 81(2-3): p. 229-35.

* cited by examiner

FIG. 9C  FIG. 9D

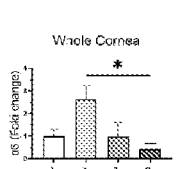
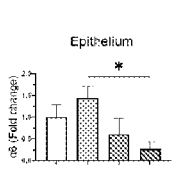
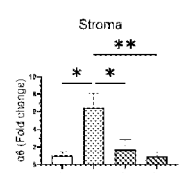
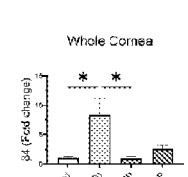
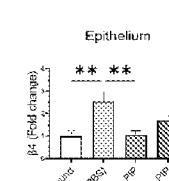
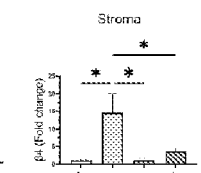
FIG. 10B    FIG. 10C    FIG. 10D    FIG. 10E    FIG. 10F    FIG. 10G
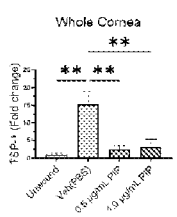
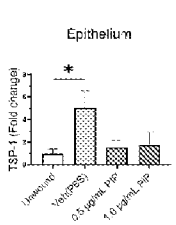
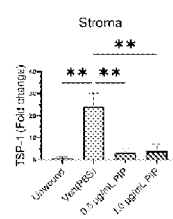
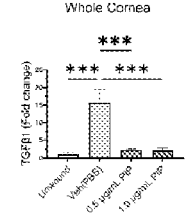
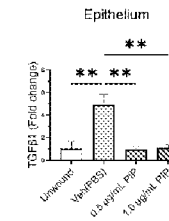
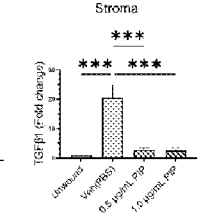
FIG. 10H    FIG. 10I    FIG. 10J    FIG. 10K    FIG. 10L    FIG. 10M
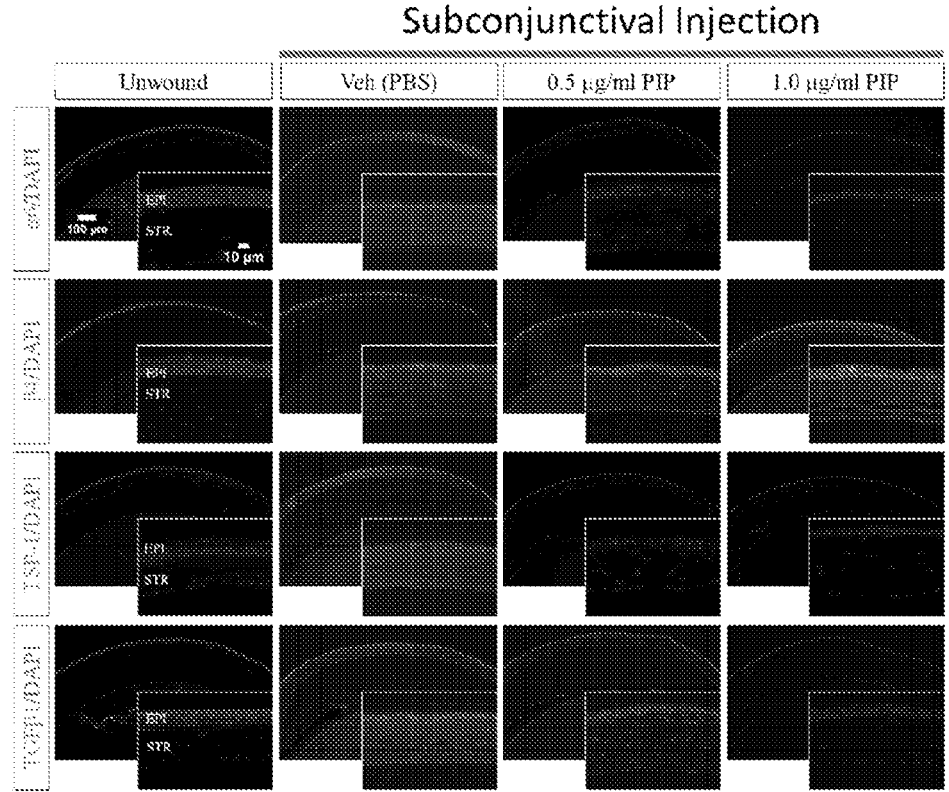
FIG. 11A

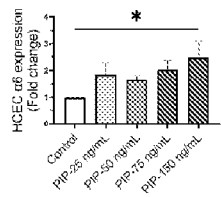 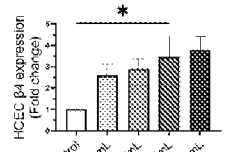 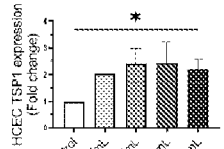 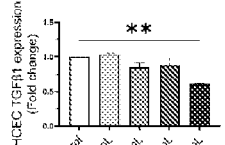
FIG. 12D  FIG. 12E  FIG. 12F  FIG. 12G
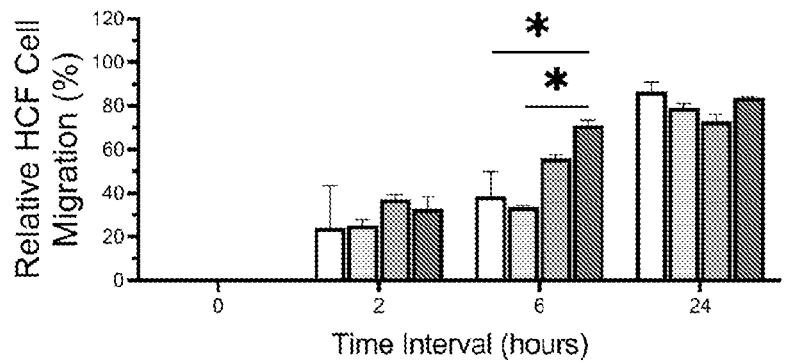
FIG. 13
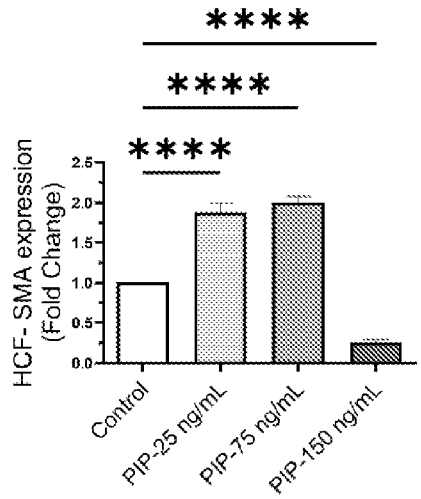 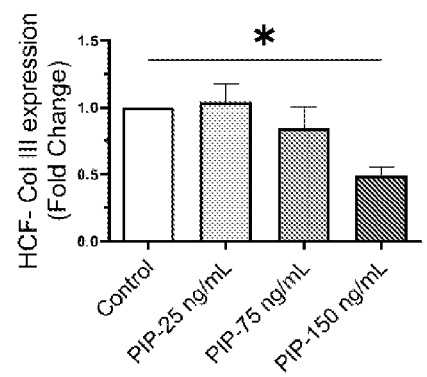
FIG. 14A  FIG. 14B

TREATMENT FOR OCULAR FIBROSIS

CROSS-REFERENCE TO RELATED APPLICATIONS

This application is a National Stage of International Application No. PCT/US2023/017816, filed Apr. 7, 2023, which claims the benefit of U.S. Provisional Application No. 63/328,826, filed Apr. 8, 2022. The contents of each of which are incorporated by reference in their entirety.

STATEMENT OF FEDERALLY-FUNDED RESEARCH

This invention was made with government support under EY030028 awarded by the National Institutes of Health. The government has certain rights in this invention.

TECHNICAL FIELD OF THE INVENTION

The present invention relates in general to the field of ocular fibrosis, and more particularly, to a novel therapeutic treatment to prevent or reduce ocular fibrosis.

BACKGROUND OF THE INVENTION

Without limiting the scope of the invention, its background is described in connection with ocular fibrosis.

Corneal scarring, or fibrosis, is the third leading cause of blindness worldwide, and the most important cause of pediatric blindness affecting more than 1.3 million people in the United States alone. Not only are significant monetary costs associated with corneal scarring, but it also has a significant impact on quality of life and career outlook. To date, numerous studies have been conducted on corneal scarring, unfortunately, no efficacious or long-term treatments are available for curing corneal scarring without causing considerable side effects. Even corneal transplantation, which is the leading viable treatment for vision restoration in patients with severe corneal scarring. results in serious side effects.

One such method is taught in U.S. Pat. No. 10,195,145, issued to Niitsu, et al., entitled "Method for treating fibrosis using siRNA and a retinoid-lipid drug carrier". These inventors are said to teach a method for treating a fibrotic disease by administering a pharmaceutical composition comprising a drug carrier, which comprises a lipid and a retinoid, and a double-stranded nucleic acid molecule, which comprises an antisense sequence to mRNA encoding human hsp47.

Another method is taught in U.S. Pat. No. 9,714,424, issued to Bernstein, et al., entitled, "RNAi inhibition of USP10 to treat ocular disorders". These inventors are said to teach a reduction of ocular scarring by silencing the expression of USP10 in the area of a wound under healing to reduce the accumulation of integrin on the cell's surface and activation of the fibrotic growth factor TGF beta, thereby preventing ocular scarring.

Despite these advances, a need remains for novel treatments for preventing and treating optical scarring. One of the main challenges in developing new therapeutic targets to treat corneal scars is the lack of a deep understanding of the mechanisms that cause corneal fibrosis and how key signaling proteins and effector cascades impact scar formation.

SUMMARY OF THE INVENTION

As embodied and broadly described herein, an aspect of the present disclosure relates to ocular scarring. The invention includes a method of treating ocular fibrosis of the eye in a human subject, the method comprising administering to the human subject in need of treatment a therapeutically effective amount of a prolactin-Inducible Protein (PIP) which is capable of inhibiting or reversing the ocular fibrosis. In one aspect, the ocular fibrosis is selected from the group consisting of Grave's ophthalmopathy, epiretinal fibrosis, retinal fibrosis, subretinal fibrosis, subretinal fibrosis associated with macular degeneration, subretinal fibrosis associated with wet macular degeneration, diabetic retinopathy, glaucoma, corneal fibrosis, post-surgical fibrosis, fibrosis from cataract surgery, fibrosis from trabeculectomy for glaucoma, conjunctival fibrosis, and subconjunctival fibrosis. In another aspect, the PIP is administered orally, topically, intraocularly, intravitreally, subconjunctivally, subcutaneously, intramuscularly, by eye drops, or in an implant. In another aspect, the method comprises administering the PIP to a subject in which PIP mRNA expression has been downregulated. In another aspect, the method comprises administering the PIP when the expression of at least one of TGF-$\beta$1, TGF-$\beta$2, TGF-$\beta$3, integrin $\alpha$6, integrin $\beta$4, or Thrombospondin-1 has been determined to be upregulated. In another aspect, the method comprises determining whether PIP is upregulated in the subject and administering the PIP to a subject in which the expression of at least one of TGF-$\beta$1, TGF-$\beta$2, TGF-$\beta$3, integrin $\alpha$6, integrin $\beta$4, or Thrombospondin-1 has been determined to be upregulated. In another aspect, the expression of the PIP mRNA has been downregulated by the level of expression of PIP has not been reduced. In another aspect, the fibrosis is caused by a trauma or injury selected from burns, cuts, stabs, scrapes, punctures, penetrations, dystrophies, or blunt trauma.

As embodied and broadly described herein, an aspect of the present disclosure relates to a method of treating ocular fibrosis characterized by fibrosis selected from the group consisting of: Grave's ophthalmopathy, epiretinal fibrosis, retinal fibrosis, subretinal fibrosis, subretinal fibrosis associated with macular degeneration, subretinal fibrosis associated with wet macular degeneration, diabetic retinopathy, glaucoma, corneal fibrosis, post-surgical fibrosis, fibrosis from cataract surgery, fibrosis from trabeculectomy for glaucoma, conjunctival fibrosis, and subconjunctival fibrosis in a human subject, the method comprising administering to the human subject in need of treatment a therapeutically effective amount of a prolactin-Inducible Protein (PIP) sufficient to inhibit or reverse the ocular fibrosis. In one aspect, the PIP is administered orally, topically, intraocularly, subconjunctivally, intravitreally, subcutaneously, intramuscularly, by eye drops, or in an implant. In another aspect, the method comprises administering the PIP to a subject in which PIP mRNA expression has been downregulated. In another aspect, the method comprises administering the PIP when the expression of at least one of TGF-$\beta$1, TGF-$\beta$2, TGF-$\beta$3, integrin $\alpha$6, integrin $\beta$4, or Thrombospondin-1 has been determined to be upregulated. In another aspect, the method further comprises determining whether PIP is upregulated in the subject and administering the PIP to a subject in which the expression of at least one of TGF-$\beta$1, TGF-$\beta$2, TGF-$\beta$3, integrin $\alpha$6, integrin $\beta$4, or Thrombospondin-1 has been determined to be upregulated. In another aspect, the expression of the PIP mRNA has been downregulated by the level of expression of PIP has not been reduced. In another aspect, the fibrosis is caused by a trauma or injury selected from burns, cuts, stabs, scrapes, punctures, penetrations, dystrophies or blunt trauma.

BRIEF DESCRIPTION OF THE DRAWINGS

For a more complete understanding of the features and advantages of the present invention, reference is now made to the detailed description of the invention along with the accompanying figures and in which:

(FIG. 8A) Representative corneal fluorescence staining images in mice. The mice received subconjunctival injection 10 μl PBS or PIP per eye daily post corneal epithelial injury. (FIG. 8B) The progress of wound healing was quantified by measuring the pixel of green pigment per eye with Image J. All values are mean±SEM, n=20, ANOVA. *p<0.05, p<0.01, **p<0.0001.

FIGS. 9A to 9D show that PIP restored the central cornea epithelial thickness after corneal epithelial injury. (FIG. 9A) Representative hematoxylin and eosin (H&E) staining images of eye sections of mice received PBS or PIP eyedrop treatment. (FIG. 9C) Representative H&E staining images of eye sections of mice received PBS or PIP subconjunctival injection treatment. (FIG. 9B, FIG. 9D) The central epithelium thickness was measured by Image J. EPI: epithelium. STR: stroma. All values are mean±SEM, n=12, ANOVA. *p<0.05, ****p<0.0001.

FIGS. 10A to 10M show that PIP eyedrop treatment downregulated integrin α6, integrin β4, TGF-β1, and Thrombospondin-1 expression levels in the mice with wounded corneas. (FIG. 10A) Representative immunostaining images of integrin α6, β4, Thrombospondin-1(TSP-1), TGF-β1, and DAPI in corneal sections of mice receiving eyedrop treatment post corneal wound and age-matched unwound controls. EPI: epithelium. STR: stroma. (FIG. 10B-FIG. 10M) The fluorescence intensity of integrin α6, β4, Thrombospondin-1(TSP-1) and TGF-β1 in the whole cornea, epithelial layer and stroma layer in (A) was quantified using Image J (n=4). All values are mean±SEM, n=4, ANOVA. *p<0.05, p<0.01, *p<0.001.

FIGS. 11A to 11M show the effect of PIP subconjunctival injection treatment on mice wounded corneas. (FIG. 11A) Representative immunostaining images of integrin α6, β4, Thrombospondin-1(TSP-1), TGF-β1, and DAPI in corneal sections of mice receiving subconjunctival injection treatment post corneal wound and age-matched unwound controls. EPI: epithelium. STR: stroma. (FIG. 11B-FIG. 11M) The fluorescence intensity of integrin α6, β4, Thrombospondin-1(TSP-1) and TGF-β1 in the whole cornea, epithelial layer and stroma layer in (FIG. 11A) was quantified using Image J (n=4). All values are mean±SEM, n=4, ANOVA. *p<0.05, **p<0.01.

FIGS. 12A to 12G shows the effect of PIP on human corneal epithelial cells, (FIG. 12A) Representative images of scratch assay of PIP stimulated HCECs. (FIG. 12B) Scratch assay quantification showing that PIP significantly increases cell migration in a concentration-dependent manner as early as 6 hours post wounding. Values are mean±SEM, n=4, ANOVA. *p<0.05, *p<0.001, **p<0.0001. (FIG. 12C) Western blot analysis of integrin α6, β4, Thrombospondin-1(TSP-1), and TGF-β1 in HCEC treated with PIP. (FIG. 12D-FIG. 12G) The protein expression of integrin α6, β4, TSP-1, and TGF-β1 were normalized to β-actin. All values are mean±SEM, n=3, ANOVA. *p<0.05, **p<0.01.

FIG. 13 shows the results from a scratch wound healing assay. Scratch assay quantification of PIP stimulated HCFs showing that PIP significantly increases cell migration in a concentration-dependent manner as early as 6 hours post wounding. Values are mean±SEM, n=4-8, 2way ANOVA. *p<0.05.

FIGS. 14A and 14B shows the protein expression for SMA and Col III in HCFs. (FIG. 14A) SMA protein expression normalized to GAPDH in HCFs showing a significant upregulation at 25 ng/ml and 75 ng/ml of PIP and a significant downregulation for the higher concentration of PIP (150 ng/ml), mean±SEM, n=4, ANOVA. ****p<0.0001. (FIG. 14B) PIP at a concentration of 150 ng/mL shows a significant downregulation of Col III in HCFs. mean±SEM, n=3, ANOVA. *p<0.05.

DETAILED DESCRIPTION OF THE INVENTION

Figure 1:
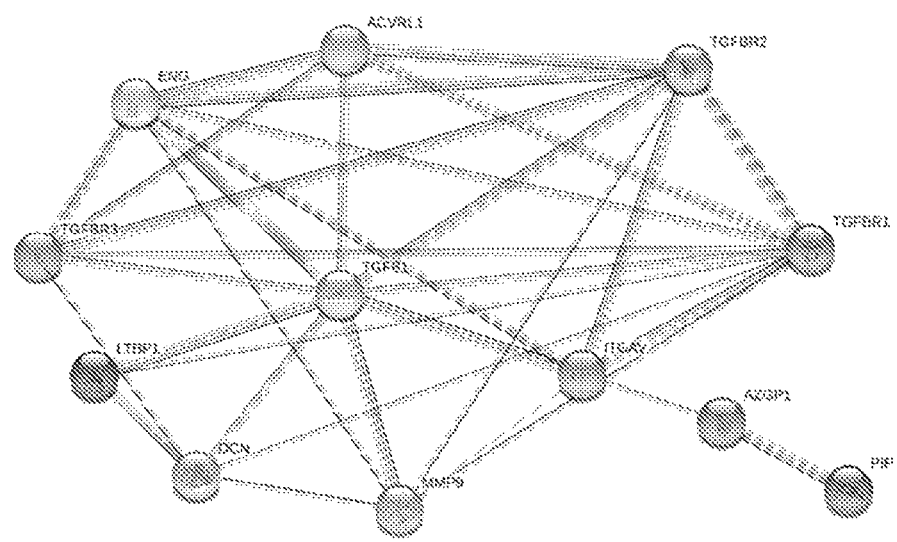
FIG. 1 shows a STRING analysis for PIP and TGF-β1 interactions. Several key players were found: Integrin alpha-V (ITGAV); Endoglin; Vascular endothelium glycoprotein (ENG); Decorin (DCN); and all TGF-β receptors (TGFβR1, TGFβR2, and TGFβR3).

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Ocular Surgery and Fibrotic Complications. The contracture of scar tissue resulting from eye surgery, such as glaucoma surgery, can result in scarring and contraction of tissues as a result of the formation of drainage. Current anti-scarring regimens such as treatment with 5-fluorouracil or Mitomycin C are of limited use because of the severe complications involved with the systemic use of these antineoplastic agents, including blindness.

Moreover, the contraction of scar tissue formed after corneal trauma or corneal surgery, for example, laser or surgical treatment for myopia or refractive error, leads to inaccurate results following the surgery. For example, scar tissue may be formed in, on, or about the vitreous humor or the retina. Such scaring can lead to blindness in diabetics.

Scar tissue can also form after retinal detachment, commonly referred to as proliferative vitreoretinopathy (PVR). PVR is a common complication following retinal detachment and is associated with a retinal hole or break. PVR most often results from the growth of cellular membranes within the vitreous cavity (e.g., the front and back surfaces of the retina) containing retinal pigment epithelial (RPE) cells. These cellular membranes become essentially scar tissues, exert traction on the retina, and trigger recurrences of retinal detachment (even following a successful retinal detachment surgery).

Scar tissue may also be formed in the orbit or on eye and eyelid muscles following orbital, eyelid, or squint surgery. Scarring of the conjunctiva occurs in cicatricial disease, inflammatory disease, for example, pemphigoid, or infective disease, for example, trachoma. A further eye problem associated with the contraction of scar tissues is the opacification and contracture of the lens capsule after, e.g., cataract removal.

The important role for MMPs has been recognized in ocular diseases that include wound healing, dry eye, sterile corneal ulceration, recurrent epithelial erosion, corneal neovascularization, pterygium, conjunctivochalasis, glaucoma, PVR, and ocular fibrosis. Some corneal dystrophies can lead to scarring, e.g., keratoconus, Fuchs' dystrophy, Reis-Bucklers and lattice corneal dystrophies.

As used herein, the term "agent" refers to a therapeutically active compounds or a potentially therapeutic active compound, PIP. An agent can be a previously known or unknown compound. As used herein, an agent is typically a PIP protein, variant thereof, or a nucleic acid therapeutic that expressed the PIP.

As used herein, the terms "amelioration" or "treatment" is understood as meaning to lessen or decrease at least one sign, symptom, indication, or effect of a specific disease or condition, specifically, ocular scarring. For example, amelioration or treatment of the ocular scarring can be to reduce, delay, or eliminate one or more signs or symptoms of ocular scarring including, but not limited to, pain, a reduction in night vision, a reduction in overall visual acuity, a reduction in visual field, a reduction in the cone density in one or more quadrants of the retina, thinning of retina, particularly the outer nuclear layer, reduction in a- or b-wave amplitudes on scotopic or photopic electroretinograms (ERGs); or any other clinically acceptable indicators of disease state or progression. Amelioration and treatment can require the administration of more than one dose of PIP, either alone or in conduction with other therapeutic agents and interventions. Amelioration or treatment does not require that the disease or condition be cured.

As used herein, the terms "rescue" or "reverse" refers to the ability of a drug to reverse (i.e., rescue) an established fibrotic phenotype (in vitro or in vivo). This can be utilized for any disease/trauma that has already progressed to fibrotic tissue. If you can rescue/reverse fibrosis, that saves people from going to surgical solutions, i.e., corneal transplantation.

As used herein, the terms "prevention" or "inhibition" refers to the ability of a drug to prevent (i.e., arrest) the formation of fibrotic tissue. Certain surgeries are known to cause fibrosis (generally mild versions), so the drug can be given to patients as preventative measure. It can also be used at the very early stages of the fibrotic tissue formation.

As used herein, the term "co-administration" refers to the administration of PIP and one or more agents to a subject such that the agents are present and active in the subject at the same time. Co-administration does not require the preparation of an admixture of the agents or simultaneous administration of the agents.

As used herein, the terms "effective amount" or "effective doses" refer to that amount of an agent to produce the intended pharmacological, therapeutic, or preventive results. The pharmacologically effective amount results in the amelioration of one or more signs or symptoms of a disease or condition or the advancement of a disease or conditions or cause the regression of the disease or condition. For example, a therapeutically effective amount preferably refers to the amount of a therapeutic agent that decreases vision loss, the loss of overall visual acuity, the loss of visual field, by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or more as compared to an untreated control subject over a defined period of time, e.g., 2 weeks, one month, 2 months, 3 months, 6 months, one year, 2 years, 5 years, or longer. More than one dose may be required to provide an effective dose.

As used herein, the terms "effective" and "effectiveness" include both pharmacological effectiveness and physiological safety. Pharmacological effectiveness refers to the ability of the treatment to result in a desired biological effect in the patient. Physiological safety refers to the level of toxicity, or other adverse physiological effects at the cellular, organ, and/or organism level (often referred to as side-effects) resulting from administration of the treatment. On the other hand, the term "ineffective" indicates that a treatment does not provide sufficient pharmacological effect to be therapeutically useful, even in the absence of deleterious effects, at least in the unstratified population. Such treatment may be ineffective in a subgroup that can be identified by the expression profile or profiles. "Less effective" means that the treatment results in a therapeutically significant lower level of pharmacological effectiveness and/or a therapeutically greater level of adverse physiological effects, e.g., greater scarring.

Thus, in connection with the administration of a drug, a drug which is "effective against" a disease or condition indicates that administration in a clinically appropriate manner results in a beneficial effect for at least a statistically significant fraction of patients, such as an improvement of symptoms, a cure, a reduction in disease signs or symptoms, extension of life, improvement in quality of life, or other effects generally recognized as positive by medical doctors familiar with treating the particular type of disease or condition.

As used herein, the term phrase "pharmaceutically acceptable carrier" is art-recognized and includes a pharmaceutically acceptable material, composition, or vehicle, suitable for administering compounds of the present invention to mammals. The carriers include liquid or solid filler, diluent, excipient, solvent, or encapsulating material, involved in carrying or transporting the subject agent from one organ, or portion of the body, to another organ, or portion of the body. Each carrier must be "acceptable" in the sense of being compatible with the other ingredients of the formulation and not injurious to the patient. For example, pharmaceutically acceptable carriers for administration of cells typically include a carrier acceptable for delivery by injection, and do not include agents such as detergents or other compounds that could damage the cells to be delivered. Some examples of materials which can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations, particularly phosphate-buffered saline solutions which are preferred for intraocular delivery.

Wetting agents, emulsifiers, and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include water-soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, α-tocopherol, and the like; and metal chelating agents, such as citric acid, ethylenediamine tetraacetic acid (EDTA), sorbitol, tartaric acid, phosphoric acid, and the like.

Formulations of the present invention include those suitable for oral, nasal, topical, transdermal, buccal, sublingual, intramuscular, intraperitoneal, intraocular, intravitreal, posterior juxtascleral, anterior juxtascleral, retrobulbar, subretinal, subconjuctival injection for ocular surface/cornea drug delivery, and/or other routes of parenteral administration. The specific route of administration will depend, inter alia, on the specific cell to be targeted. The formulations may conveniently be presented in unit dosage form and may be prepared by any methods well known in the art of pharmacy. The amount of active ingredient that can be combined with a carrier material to produce a single dosage form will generally be that amount of the compound that produces a therapeutic effect.

As used herein, the term a "polypeptide" or "peptide" is understood as two or more independently selected natural or non-natural amino acids joined by a covalent bond (e.g., a peptide bond). A peptide can include 2, 3, 4, 5, 6, 7, 8, 9, 10, 11, 12, 13, 14, 15, 16, 17, 18, 19, 20, or more natural or non-natural amino acids joined by peptide bonds. Polypeptides as described herein include full-length proteins (e.g., fully processed proteins) as well as shorter amino acids sequences (e.g., fragments of naturally occurring proteins or synthetic polypeptide fragments).

As used herein, "prevention" is understood as to limit, reduce the rate or degree of onset, or inhibit the development of at least one sign or symptom of a disease or condition particularly in a subject prone to developing the disease or disorder. Prevention can include the delay of onset of one or more signs or symptoms of ocular scarring that can be caused by, e.g., age-related macular degeneration, glaucoma, and/or diabetic retinopathy and need not be prevention of the appearance of at least one sign or symptom of the disease throughout the lifetime of the subject. Prevention can require the administration of more than one dose of an agent or therapeutic.

As used herein, the term "subject" refers to living organisms, in particular, humans. In certain embodiments, the living organism is an animal, in certain preferred embodiments, the subject is a mammal, in certain embodiments, the subject is a domesticated mammal or a primate including a non-human primate. Examples of subject include humans, monkeys, dogs, cats, mice, rates, cows, horses, goats, and sheep. A human subject may also be referred to as a subject or patient.

A subject "suffering from or suspected of suffering from" a specific disease, condition, or syndrome has a sufficient number of risk factors or presents with a sufficient number or combination of signs or symptoms of the disease, condition, or syndrome such that a competent individual would diagnose or suspect that the subject was suffering from the disease, condition or syndrome. Methods for identification of subjects suffering from or suspected of suffering from ocular scarring, which can be caused by conditions such as age-related macular degeneration, glaucoma, and/or diabetic retinopathy are known to the skilled artisan. Subjects suffering from, and/or suspected of suffering from, a specific disease, condition, or syndrome are not necessarily two distinct groups.

As used herein, the term "therapeutically effective amount," refers to an amount of an agent which is effective, upon single or multiple doses administered to the cell or subject, in prolonging the survivability of the patient with such a disorder, reducing one or more signs or symptoms of the disorder, preventing or delaying and the like beyond that expected in the absence of such treatment.

The PIP and, optionally, other therapeutic intervention(s), can be administered to a subject, either alone or in combination with one or more additional therapeutic agents or interventions, or as a pharmaceutical composition in mixture with conventional excipient(s), e.g., pharmaceutically acceptable carrier, or therapeutic treatments.

The pharmaceutical agents may be conveniently administered in unit dosage form and may be prepared by any of the methods well known in the pharmaceutical arts, e.g., as described in Remington's Pharmaceutical Sciences (Mack Pub. Co., Easton, PA, 1985). Formulations for parenteral administration may contain common excipients such as sterile water or saline, polyalkylene glycols such as polyethylene glycol, oils of vegetable origin, hydrogenated naphthalenes and the like. In particular, biocompatible and/or biodegradable lactide polymer, lactide/glycolide copolymer, or polyoxyethylene-polyoxypropylene copolymers may be useful excipients to control the release of certain agents.

The present invention is directed to the use of PIP to treat optical scarring. In one embodiment, the present invention includes a method for the treatment of optical scarring in a human that comprises administering to the human therapeutically effective amount of PIP. In some embodiments, the PIP is provided in or with a pharmaceutically acceptable carrier. In other embodiments, PIP is administered intraocularly, subretinally, intravitreally, posterior juxtascleral, anterior juxtascleral, retrobulbar, orally, intravenously, intramuscularly, topically, sublingually, or rectally.

In certain embodiments involving the delivery of more than one agent, the dosage regiment may be formulated to provide two or more drugs to the posterior segment of the eye under different dosage regimens. For example, the dosage of the antioxidant in an implant may be made to be discontinuous over the treatment period while a non-discontinuous dosage of an auxiliary agent is administered in an implant over the same overall time period. The implant containing the PIP and the implant containing the auxiliary agent may be different implants or the same implant comprising methods of differentially administering the PIP, e.g., different coatings or shells that contain PIP in a biodegradable polymer, thus permitting regulation of the delivery of one or more drug over the time of the treatment. The implants are effective to provide a therapeutically effective dosage of the agent or agents directly to a region of the eye to treat ocular scarring. Thus, with a single administration therapeutic agents will be made available at the site where they are needed and may be maintained for an extended period of time, rather than subjecting the patient to repeated injections or, in the case of self-administered drops, ineffective treatment with only limited bursts of exposure to the active agent or agents.

One such intraocular implant in accordance with the disclosure herein comprises a therapeutic component and a drug release sustaining component associated with the therapeutic component. In accordance with the present invention, the therapeutic component comprises, consists essentially of, or consists of, PIP. The drug release sustaining component is associated with the therapeutic component to sustained release of a therapeutically effective amount of the antioxidant into an eye in which the implant is placed. The therapeutic amount of PIP is released into the eye for a period of time greater than about two months after the implant is placed in the eye.

As used herein, an "intraocular implant" refers to a device or element that is structured, sized, or otherwise configured to be placed "in an eye", including the subconjunctival space. Intraocular implants are generally biocompatible with the physiological conditions of an eye and do not cause adverse side effects. Intraocular implants may be placed in an eye without disrupting vision of the eye.

As used herein, a "therapeutic component" refers to a portion of a formulation comprising one or more therapeutic agents or substances used to treat a medical condition of the eye. The therapeutic component may be a discrete ingredient in the formulation. The therapeutic agents of the therapeutic component are typically ophthalmically acceptable and are provided in a form that does not cause adverse reactions when the formulation is placed in an eye.

As used herein, a "drug release sustaining component" refers to PIP that is formulated and effective to provide a sustained release of the therapeutic agents. A drug release sustaining component may be a biodegradable polymer matrix, or it may be a coating covering a core region of an implant.

As used herein, "associated with" refers to PIP being mixed with, dispersed within, coupled to, covering, or surrounded. With respect to intraocular implants which comprise a therapeutic component associated with a biodegradable polymer matrix, "associated with" specifically excludes biodegradable polymeric coatings that may be provided on or around the matrix.

As used herein, an "ocular region" or "ocular site" refers generally to any area of the eyeball, including the anterior and posterior segment of the eye, and which generally includes, but is not limited to, any functional (e.g., for vision) or structural tissues found in the eyeball, or tissues or cellular layers that partly or completely line the interior or exterior of the eyeball. Specific examples of areas of the eye in an ocular region include the anterior chamber, the posterior chamber, the vitreous cavity, the choroid, the suprachoroidal space, the conjunctiva, the subconjunctival space, the episcleral space, the intracorneal space, the epicorneal space, the sclera, the pars plana, surgically-induced avascular regions, the macula, and the retina.

As used herein, an "ophthalmic or ocular disease" or "ophthalmic or ocular condition" is a disease, ailment, or condition which affects or involves the eye or one of the parts or regions of the eye. Broadly speaking the eye includes the eyeball, or globe, the tissues and fluids which constitute the eye, the periocular muscles (such as the oblique and rectus muscles), and the portion of the optic nerve which is within or adjacent to the eye.

An anterior ocular condition is a disease, ailment, or condition which affects or which involves an anterior (i.e. front of the eye) ocular region or site, such as a periocular muscle, an eyelid, or an eyeball tissue or fluid which is located anterior to the posterior wall of the lens capsule or ciliary muscles. Thus, an anterior ocular condition primarily affects or involves the conjunctiva, the cornea, the anterior chamber, the iris, the posterior chamber (behind the retina but in front of the posterior wall of the lens capsule), the lens or the lens capsule, and blood vessels and nerve which vascularize or innervate an anterior ocular region or site.

The term "biodegradable polymer" refers to a polymer or polymers which degrade in vivo, and wherein erosion of the polymer or polymers over time occurs concurrently with or subsequent to release of the therapeutic agent. Specifically, hydrogels such as methylcellulose which act to release drugs through polymer swelling are specifically excluded from the term "biodegradable polymer". The terms "biodegradable" and "bioerodible" are equivalent and are used interchangeably herein. A biodegradable polymer may be a homopolymer, a copolymer, or a polymer comprising more than two different polymeric units.

The term "treat", "treating", or "treatment" as used herein, refers to reduction or resolution or prevention of an ocular condition, ocular injury or damage, or to promote healing of injured or damaged ocular tissue.

The term "therapeutically effective amount" as used herein, refers to the level or amount of agent needed to treat ocular scarring or reduce or prevent ocular injury or damage without causing significant negative or adverse side effects to the eye or a region of the eye.

Intraocular implants have been developed which can release drug loads over various time periods. These implants, which when inserted into an eye, such as, without limitation, the vitreous of an eye or the subconjunctival space, provide therapeutic levels of a steroid and/or auxiliary agent for extended periods of time (e.g., for about 2 months or more).

It will be appreciated that the actual preferred amounts of active compounds used in a given therapy will vary according to e.g., the specific compound being utilized, the particular composition formulated, the mode of administration and characteristics of the subject, e.g., the species, sex, weight, general health and age of the subject. Optimal administration rates for a given protocol of administration can be readily ascertained by those skilled in the art using conventional dosage determination tests conducted with regard to the foregoing guidelines.

The ranges provided herein are understood to be shorthand for all of the values within the range.

As used herein, the embodiments of this invention are defined to include pharmaceutically acceptable derivatives thereof. A "pharmaceutically acceptable derivative" means an active variant of the PIP of the invention which, upon administration to a recipient, is capable of providing (directly or indirectly) a compound of this invention. Particularly favored derivatives are those that increase the bioavailability of the compounds of this invention when such compounds are administered to a mammal (e.g., by allowing an orally administered compound to be more readily absorbed into the blood, to increase serum stability or decrease the clearance rate of the compound) or which enhance the delivery of the parent compound to a biological compartment (e.g., the brain or lymphatic system) relative to the parent species. Derivatives include derivatives where a group that enhances aqueous solubility or active transport through the gut membrane is appended to the structure of formulae described herein.

The embodiments of this invention may be modified by appending appropriate functionalities to enhance selective biological properties. Such modifications are known in the art and include those which increase biological penetration into a given biological compartment (e.g., blood, lymphatic system, central nervous system), increase oral availability, increase solubility to allow administration by injection, alter metabolism and alter the rate of excretion. Pharmaceutically acceptable salts of the compounds of this invention include those derived from pharmaceutically acceptable inorganic and organic acids and bases. Examples of suitable acid salts include acetate, adipate, benzoate, benzenesulfonate, butyrate, citrate, digluconate, dodecylsulfate, formate, fumarate, glycolate, hemisulfate, heptanoate, hexanoate, hydrochloride, hydrobromide, hydroiodide, lactate, maleate, malonate, methanesulfonate, 2-napthalenesulfonate, nicotinate, nitrate, palmoate, phosphate, picrate, pivalate, propionate, salicylate, succinate, sulfate, tartrate, tosylate, and undeconaoate. Salts derived from appropriate bases include alkali metal (e.g., sodium), alkaline earth metal (e.g., magnesium), ammonium and N-(alkyl)4+ salts. This invention also envisions the quaternization of any basic nitrogen-containing groups of the compounds disclosed herein. Water or oil-soluble or dispersible products may be obtained by such quaternization.

The embodiments of the invention can, for example, be administered by injection, intraocularly, intravitreally, retrobulbar, posterior juxtascleral, anterior juxtascleral, subretinal, intravenously, intraarterially, subdermally, intramuscularly, or subcutaneously; or orally, buccally, nasally, transmucosally, directly to a diseased organ by catheter, topically, or in an ophthalmic preparation, with a dosage ranging from about 0.001 to about 100 mg/kg of body weight, or according to the requirements of the particular drug and more preferably from 0.5-10 mg/kg of body weight. It is understood that when a compound is delivered directly to the eye, considerations such as body weight have less bearing on the dose.

Frequency of dosing will depend on the agent administered, the progression of the disease or condition in the subject, and other considerations known to those of skill in the art. For example, pharmacokinetic and pharmacodynamics considerations for compositions delivered to the eye, or even compartments within the eye, are different, e.g., clearance in the subretinal space is very low. Therefore, dosing can be as infrequent as once a month, once every three months, once every six months, once a year, once every five years, or less. If systemic administration of antioxidants is to be performed in conjunction with administration of expression constructs to the subretinal space, it is expected that the dosing frequency of the antioxidant will be higher than the expression construct, e.g., one or more times daily, one or more times weekly.

Dosing may be determined in conjunction with monitoring of one or more signs or symptoms of the disease, e.g., visual acuity, visual field, night visions, etc. The amount of active ingredient that may be combined with the carrier materials to produce a single dosage form will vary depending upon the host treated and the particular mode of administration. A typical preparation will contain from about 1% to about 95% active compound (w/w). Alternatively, such preparations contain from about 20% to about 80% active compound. Lower or higher doses than those recited above may be required. Specific dosage and treatment regimens for any particular patient will depend upon a variety of factors, including the activity of the specific compound employed, the age, body weight, general health status, sex, diet, time of administration, rate of excretion, drug combination, the severity ad course of the disease, condition or symptoms, the patient's disposition to the disease, condition or symptoms and the judgment of the treating physician.

The pharmaceutical compositions may be in the form of a sterile injectable preparation, for example, as a sterile injectable aqueous or oleaginous suspension. This suspension may be formulated according to techniques known in the art using suitable dispersing or wetting agents (such as, for example, TWEEN® 80) and suspending agents. The sterile injectable preparation may also be a sterile injectable solution or suspension in a non-toxic parenterally acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, carboxymethyl cellulose, or similar dispersing agents which are commonly used in the formulation of pharmaceutically acceptable dosage forms such as emulsions and or suspensions. Other commonly used surfactants such as TWEENs® or SPAN® and/or other similar emulsifying agents or bioavailability enhancers which are commonly used in the manufacture of pharmaceutically acceptable solid, liquid, or other dosage forms may also be used for the purposes of formulation.

In one or more embodiments, PIP is administered in daily doses of about 0.5 to 150 mg/Kg. In other embodiments, PIP is administered two or three times daily. In another aspect, PIP is administered with a second active agent selected from ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, α-tocopherol, and the like; and metal chelating agents, such as citric acid, ethylenediamine tetraacetic acid (EDTA), sorbitol, tartaric acid, phosphoric acid, and the like.

In some embodiments, the dose of PIP for administration is 0.001-0.010, 0.01-0.1, 0.1-0.25, 0.1-0.4, 0.35-0.5, 0.5-1, 1-2, 1-3, 1-4, 1-5, 1-2.5, 2.5-3.5, 4-6, 5-8, 6-9, 7-10, 15, 20, 25, 30, 40, 50, 60, 70, 75, 80, 90, 100, 150, 150, 300, 333, 400, 500, 600, 700, 750, 800, 900, 1,000, 2,500, 5,000, 7,500, or 10,000 mg per dose. In another aspect, the dose for administration is 0.001-0.010, 0.01-0.1, 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 grams per dose. In another aspect, the PIP is delivered orally via a mini-tablet, capsule, tablet, effervescent, dual release, mixed release, sachet, powder, or liquid. In another aspect, the PIP is administered prophylactically to prevent ocular scarring.

In another embodiment, the present invention includes a method for the treatment of ocular scarring comprising: identifying a human in need of treatment for ocular scarring; and administering to the human a therapeutically effective amount of PIP sufficient to treat the ocular scarring. It will be understood that, as with the other embodiments defined above, PIP is administered in daily doses of about 0.5 to 150 mg/Kg. In another aspect, PIP is administered two or three times daily. In another aspect, PIP is administered with a second active agent as disclosed above. In another aspect, the dose of PIP for administration is 0.001-0.010, 0.01-0.1, 0.1-0.25, 0.1-0.4, 0.35-0.5, 0.5-1, 1-2, 1-3, 1-4, 1-5, 1-2.5, 2.5-3.5, 4-6, 5-8, 6-9, 7-10, 15, 20, 25, 30, 40, 50, 60, 70, 75, 80, 90, 100, 150, 150, 300, 333, 400, 500, 600, 700, 750, 800, 900, 1,000, 2,500, 5,000, 7,500, or 10,000 nanograms per dose. In another aspect, the dose for administration is 0.001-0.010, 0.01-0.1, 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 micrograms per dose. In another aspect, the PIP is delivered orally via a mini-tablet, capsule, tablet, effervescent, dual release, mixed release, sachet, powder, or liquid. In another aspect, PIP is administered prophylactically to prevent ocular scarring.

As used herein, "susceptible to" or "prone to" or "predisposed to" a specific disease or condition or the like refers to an individual who based on genetic, environmental, health, and/or other risk factors is more likely to develop a disease or condition than the general population. An increase in the likelihood of developing a disease may be an increase of about 10%, 20%, 50%, 100%, 150%, 200%, or more.

The PIP formulations described herein may also be delivered to the eye via ocular topical, intravitreal injection, posterior juxtascleral injection, anterior juxtascleral injection, and periocular injection routes. In one embodiment of the present invention, the amount of active agent, or poorly water-soluble agent, or biologic will be from about 0.001% to 30% weight to volume of the active agent in a solution for intravitreal administration. In other embodiments, the amount of active can be from 0.05% to 20% weight to volume and in some cases from 0.1% to 18% weight to volume. It is contemplated that any active agent that is poorly water-soluble, or slightly soluble, may be included in the compositions of the present invention. In other instances, highly water-soluble active or inactive agents may also be included in the compositions of the present invention.

For example, the present invention may be delivered as a thick or viscous vehicle that allows for extended-release of the active agent. For example, the PIP can be provided in any polyethyleneglycol (PEG) with a molecular weight greater than 500, 1000, 1,5000, or 2000 in the compositions and methods of the invention. PEGs for use in the compositions and methods of the invention can also include PEG 3000, PEG 4000, PEG 6000, PEG 8000, PEG 20000, or higher molecular PEGs may be utilized in the compositions and methods of the invention.

The PIP formulations of the present invention provide a number of advantages over conventional formulations because PEGs can successfully solubilize poorly soluble compounds, allowing the preparation of an efficacious ophthalmologically acceptable intravitreal, posterior juxtascleral (PJ), anterior juxtascleral, (AJ), and/or periocular formulation for local ocular delivery. Bioavailability of the drug can be modulated by controlling the molecular weight, or mixture of molecular weights, of the PEG used in the formulation. Furthermore, the preparation can be injected using a 27 or 30 gauge needle. Toxicity of the active agent can also be reduced or suitably modulated by extending its release.

The formulation of the invention may further comprise a lipid to modulate the delivery of the drug and to extend the duration. Some examples of a lipid include triglycerides, diglycerides, monoglycerides, propylene glycol esters, PEF esters of fatty acid and their mixtures. Preferred lipids include glyceryl monolaurate; glyceryl dilaurate; glyceryl monomyristate; glyceryl dimyristate; glyceryl monopalmitate; glyceryl dipalmitate; glyceryl monostearate; glyceryl distearate; glyceryl monooleate; glyceryl dioleate; glyceryl monolinoleate; glyceryl dilinoleate; glyceryl monoarachidate; glyceryl diarachidate; glyceryl monobehenate; glyceryl dibehenate; diethylene glycol monostearate; propylene glycol monostearate; glyceryl monostearate; glyceryl monolinoleate; glyceryl monooleate; glyceryl monopalmitate; and mixtures thereof. A preferred example of the lipid is glyceryl palmitostearate. The concentration of a lipid is generally less than 31 weight percent (wt %), but often less than 14 wt % and in some cases less than 8 wt %.

The specific dose level of the active agent for any particular human or animal depends upon a variety of factors, including the activity of the active compound used, the age, body weight, general health, time of administration, route of administration, and the severity of the pathologic condition undergoing therapy.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

Additional aspects and advantages of the present invention are set forth in the following description and claims, particularly when considered in conjunction with the accompanying drawings and examples.

Prolactin-Inducible Protein: PIP is a 17-kDa glycoprotein, originally identified as gross cystic disease fluid protein 15 (GCDFP-15) and a major component of human milk, breast cyst fluid, and saliva. PIP is a 146-amino acid long polypeptide that is found in the mammary gland, salivary and lacrimal glands, prostate, and other organs. The PIP gene is located on chromosome 7q32-36 with four exons, but only one 900 base mRNA transcript. PIP has aspartyl protease activity, which signifies the role of PIP as a secreted protein able to mediate extracellular matrix (ECM) degradation.

PIP is overexpressed in both primary and metastatic breast tumors, labeling it as a breast tumor marker. PIP is only found to be expressed in apocrine metaplasia of the breast, ductal carcinoma in situ, and not secreted in normal ductal or lobular epithelium. Despite these findings, the exact functional capacity of PIP in breast cancer has remained obscure.

In the context of the human cornea, the "mechanism-of-action" for PIP is unknown. Preliminary STRING analysis (FIG. 1) for PIP and TGF-β1, a critical contributor to corneal fibrosis, indicated the interplay with targets such as: Integrin alpha-V (ITGAV); Endoglin; Vascular endothelium glycoprotein (ENG); Decorin (DCN); and all TGF-β receptors (TGFβR1, TGFβR2, and TGFβR3).

Example 1

Prolactin-Inducible Protein—In Vitro: PIP impact was assessed on corneal stromal cell apoptosis, fibrosis, and cell migration using 2D and 3D in vitro assays.

Figure 2:
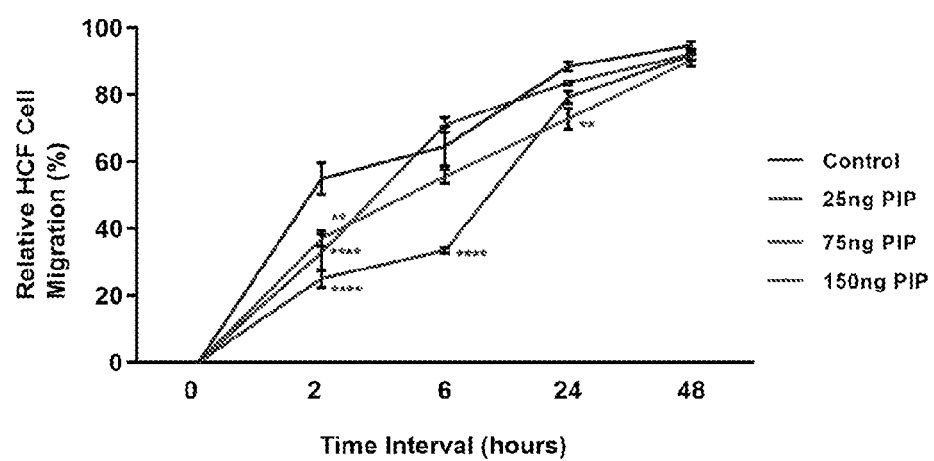
FIG. 2 shows a Scratch/migration assay, using primary HCFs with and without PIP stimulation, showed accelerated migration as early as 2 to 6 h post-wounding. The 75 and 150 ng/ml PIP concentrations were superior to the 25 ng/ml. n=6, *p<0.05; **p<0.01.

Cell migration. Briefly, $1 \times 10^6$ primary healthy corneal stromal cells/well Human Corneal Fibroblasts (HCFs) were seeded in 2D six-well plates and allowed to attain 100% confluency. Scratches were performed using a sterile micropipette tip, at time 0 h, and treated with 25 ng/ml, 75 ng/ml, or 150 ng/ml PIP. Cultures without PIP served as Controls. All wounded sites were imaged at predetermined time points (0 hr, 2 hr, 6 hr, 24 hr and 48 hr), and analyzed. In a concentration-dependent manner, PIP (75 ng/ml and 150 ng/ml) accelerated wound closure as early as 2-6 hr (FIG. 2).

Figure 3:
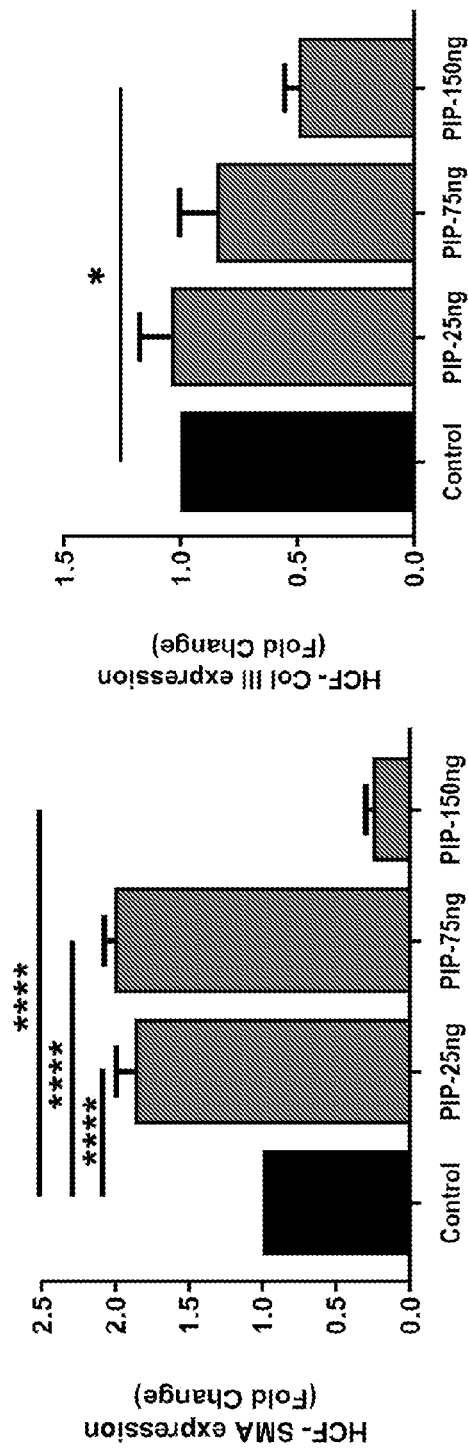
FIG. 3. Protein analysis of αSMA (left panel) and Col III (right panel), following HCFs seeded, and grown, using an established 3D in vitro model. Significant downregulation of both fibrotic markers (αSMA and Col III) was seen at 150 ng/ml PIP-stimulated constructs. n=6, *p<0.05; ****p<0.001.

Fibrosis. Using an established 3D self-assembled in vitro model, the inventors investigated the impact of PIP on corneal fibrotic markers: alpha smooth muscle actin (αSMA) and Collagen Type III (Col III). Briefly, HCFs were plated on transwell 6-well plates (24-mm polycarbonate membrane inserts with 0.4 µm pores) at a density of $1 \times 10^6$. Constructs were allowed to grow for 4 weeks in either VitC media–EMEM with 10% FBS and 0.5 mM 2-O-α-D-glucopyranosyl-L-ascorbic acid (VitC: Wako Chemicals USA, Inc.; Richmond, V.A.)—only (control), or VitC media+PIP (25 ng/ml, 75 ng/ml, or 150 ng/ml). αSMA was significantly upregulated at the two lowest PIP concentrations, but significantly downregulated at 150 ng/ml (FIG. 3—left panel). Col III was unaffected by the 25 and 75 ng/ml PIP, but was significantly downregulated with 150 ng/ml (FIG. 3—right panel). Together, PIP appeared to have noteworthy anti-fibrotic abilities.

Figure 4:
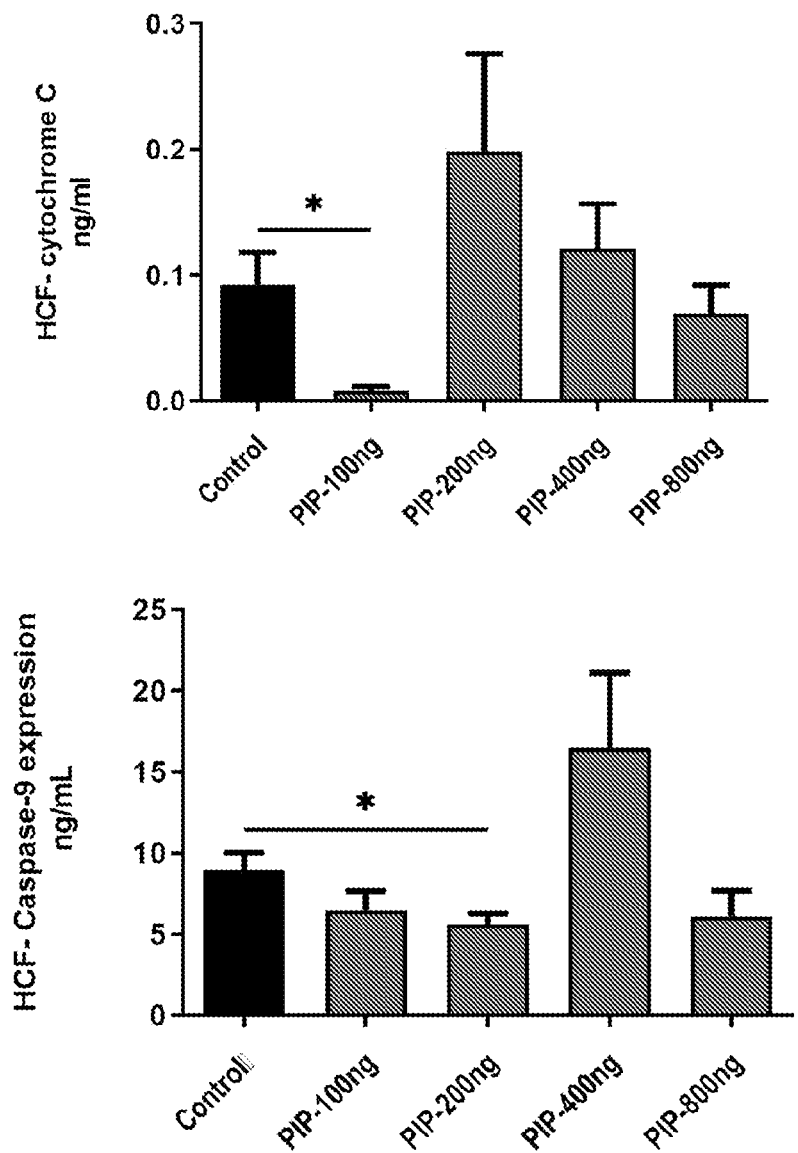
FIG. 4 shows protein analysis of Cytochrome C (left panel) and Caspase-9 (right panel), following HCFs seeded, and grown, on 2D six-well plates for 48 h, stimulated with 100 ng/ml, 200 ng/ml, 400 ng/ml, and 800 ng/ml PIP. Significant downregulation of both Cytochrome C and Caspase-9, was seen at 100 and 200 ng/ml of PIP stimulation, respectively, n=6, *p<0.05.
Figure 5A:
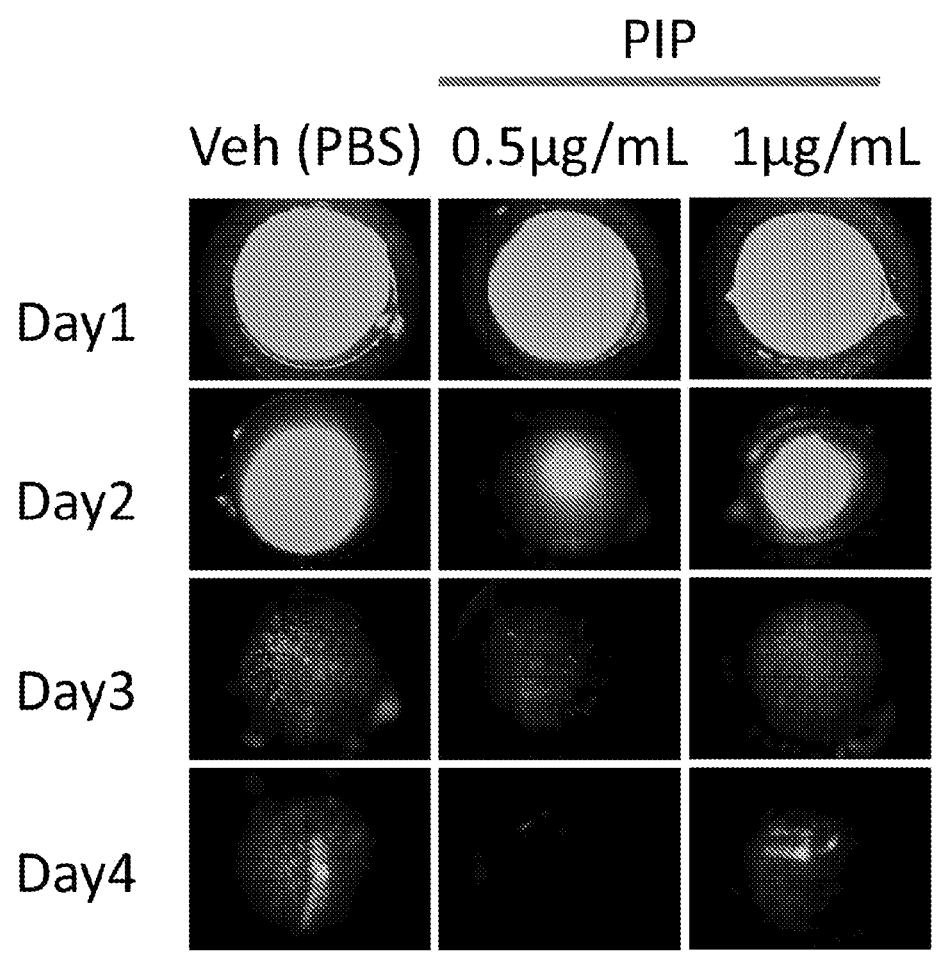
FIGS. 5A to 5D show External photos of the mouse eye (FIG. 5A), wound severity (FIG. 5B and FIG. 5C), and wound area (FIG. 5D) over time shown following epithelial debridement wound (Alger Brush) and a single/one-time PIP (0.5 μg/ml and 1 μg/ml) treatment at the time of wounding. Both PIP concentrations accelerated wound healing, with the 0.5 μg/ml concentration showing more potency. n=8, *p<0.05; p<0.01; **p<0.001.
Figure 5B:
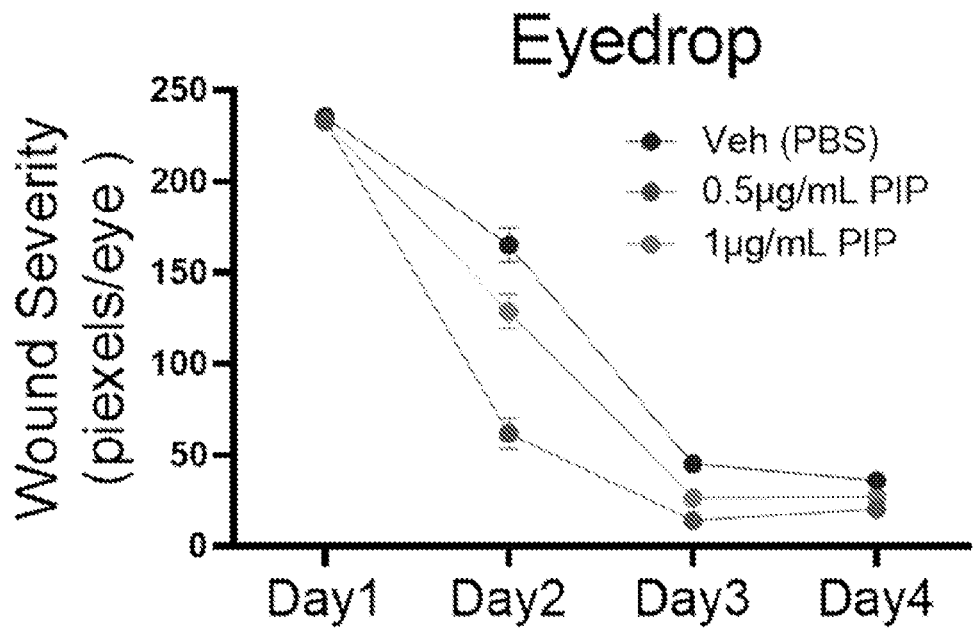
Figure 5C:
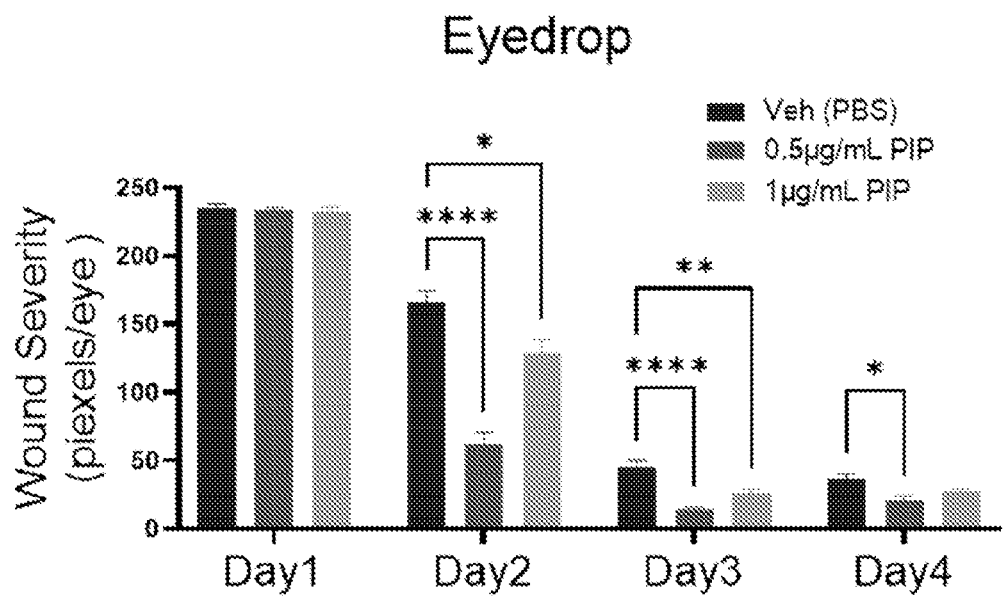
Figure 5D:
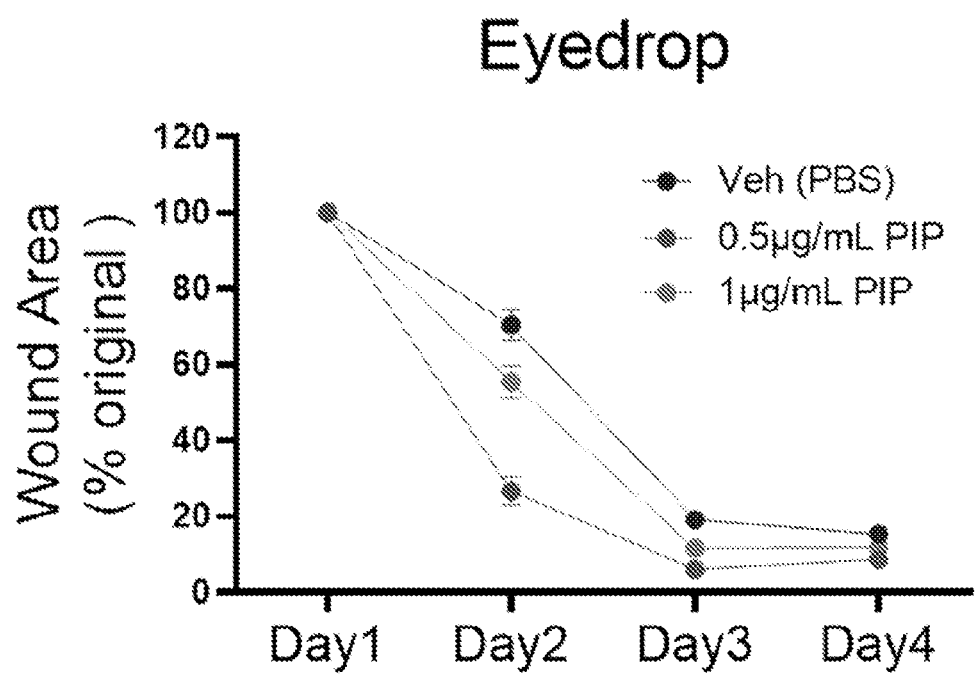

Cell apoptosis. Briefly, $1 \times 10^6$ HCFs/well were seeded in 2D six-well plates and allowed to attain 100% confluency, prior to treatment with 100 ng/ml, 200 ng/ml, 400 ng/ml, and 800 ng/ml PIP. Cultures without PIP served as controls. Protein expression of Cytochrome C was analyzed, by Western blots (WBs), at 48 h post-stimulation. At 100 ng/ml PIP showed significant downregulation of Cytochrome C (FIG. 4—left panel). Furthermore, the inventors investigated the expression of Caspase-9, a known player in cell apoptosis (FIG. 4—right panel). Caspase-9 was significantly downregulated at 200 ng/ml PIP, but not the rest of the concentrations. Note that these experiments were chronologically executed before the cell migration (FIG. 2) and fibrosis (FIG. 3) ones. Using this model, other amounts such as 25, 75, and 150 ng/ml PIP concentrations can be used, for Cytochrome C and Caspase-9, but optimum PIP concentration can be around 75 and 150 ng/ml.

Prolactin-Inducible Protein—In Vivo. During preliminary in vivo studies, C57BL/6J mice were used and corneal wound healing induced using the epithelial debridement model to evaluate the anti-fibrotic effect of PIP eye drops.

External photo and wound healing. Fluorescein staining determined the damage to the corneal epithelium, and healing rate, overtime following epithelial debridement wound (Alger Brush). PIP treated corneas showed accelerated wound healing, when compared to Controls—PBS (FIGS. 5A to 5D). 0.5 µg/ml PIP concentration was slightly more potent, in the context of wound healing speed, when compared to the 1 µg/ml PIP concentration. FIGS. 5A to 5D show External photos of the mouse eye (FIG. 5A), wound severity (FIG. 5B and FIG. 5C), and wound area (FIG. 5D) over time shown following epithelial debridement wound (Alger Brush) and a single/one-time PIP (0.5 µg/ml and 1 µg/ml) treatment at the time of wounding. Both PIP concentrations accelerated wound healing, with the 0.5 µg/ml concentration showing more potency, n=8, *p<0.05; p<0.01; **p<0.001.

Figure 6:
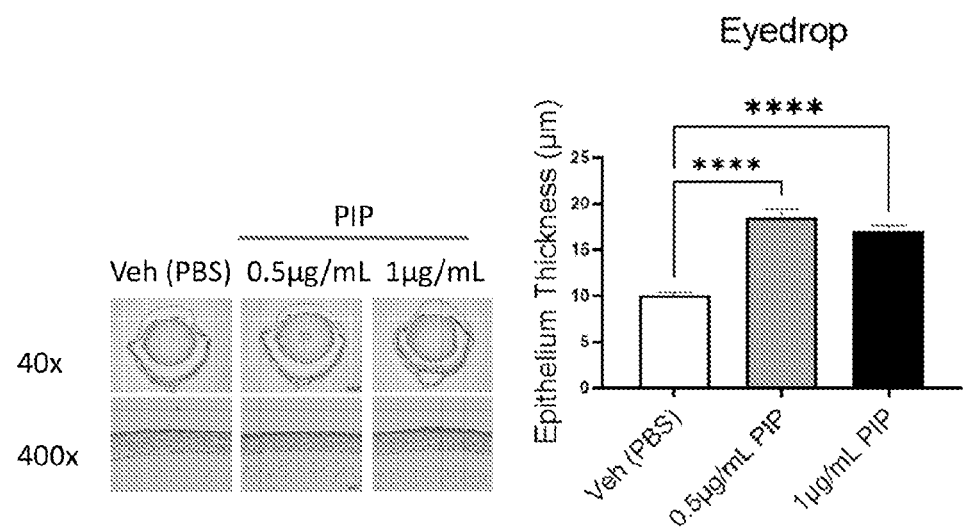
FIG. 6 shows H&E staining (right panel) and epithelial layer thickness quantification (left panel) shown following epithelial debridement wound (Alger Brush) and a single/one-time PIP (0.5 μg/ml and 1 μg/ml) treatment at the time of wounding. n=8, ****p<0.001.

Histologic Evaluation. Hematoxylin & Eosin (H&E) staining was performed of the Control (PBS), and PIP treated groups (FIG. 6). FIG. 6D shows H&E staining (right panel) and epithelial layer thickness quantification (left panel) shown following epithelial debridement wound (Alger Brush) and a single/one-time PIP (0.5 µg/ml and 1 µg/ml) treatment at the time of wounding, n=8, ****p<0.001. The stained corneal sections demonstrated significant differences in wound healing epithelization (i.e., corneal epithelium thickness). As shown, both by histological evaluation and quantification, both the PIP concentrations resulted in a thicker epithelial layer when compared to controls. As expected, no damages/changes were observed at the back of the eye.

Figure 7:
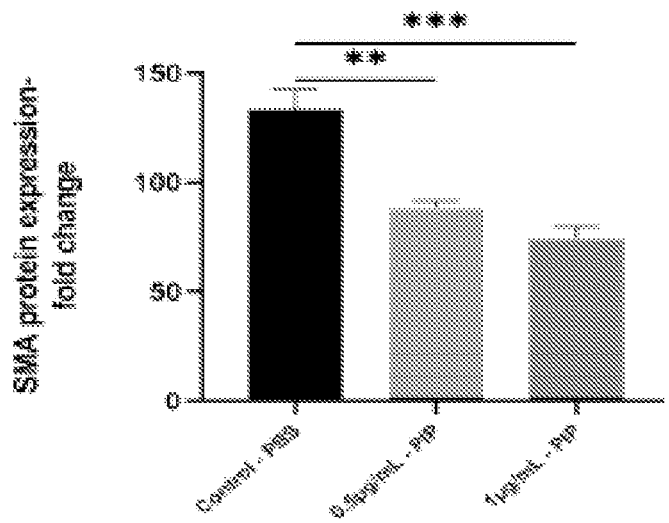
FIG. 7 shows protein expression of αSMA, in mouse corneas of the three experimental groups (PBS-controls, 0.5 μg/ml PIP, and 1 μg/ml PIP). Data showed significant downregulation of αSMA expression in PIP treated corneas, at both PIP concentrations. n=8; p<0.01; *p<0.005.

Molecular Evaluation. The inventors determined the protein expression of αSMA (FIG. 7), a fibrotic marker, in the corneas of the three experimental groups (PBS-controls, 0.5 µg/ml PIP, and 1 µg/ml PIP). Protein analysis (Western blots—WB) showed significant downregulation of αSMA expression in PIP treated corneas, suggesting that PIP topical treatment does not activate (or limit) fibrotic response(s) in the cornea. FIG. 7 shows protein expression of αSMA, in mouse corneas of the three experimental groups (PBS-controls, 0.5 µg/ml PIP, and 1 µg/ml PIP). Data showed significant down regulation of αSMA expression in PIP treated corneas, at both PIP concentrations, n=8; p<0.01; *p<0.005.

Example 2

Local administration of PIP enhanced corneal re-epithelialization, in vivo.

Figure 8A:
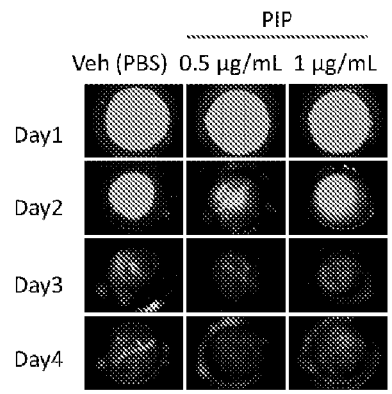
FIGS. 8A and 8B show a comparison of corneal wound healing in mice receiving subconjunctival injection treatment post injury.
Figure 8B:
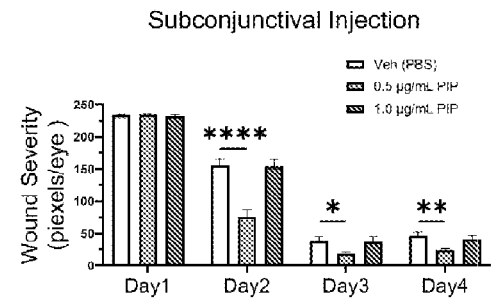

To explore the role of PIP in corneal wound healing, corneal epithelial debridement by an ocular bur was performed on C57BL/6J mice. Two different concentrations of PIP (0.5 µg/mL, 1.0 µg/mL) were applied topically or injected subconjunctivally daily, with the vehicle as control. These results showed that the corneal wound closure was significantly faster in both PIP eyedrop groups and 1.0 µg/mL PIP subconjunctival injection group (FIGS. 8A, 8B), compared to their corresponding control group.

PIP restored the central cornea epithelial thickness after corneal epithelial injury, in vivo.

Figure 9A:
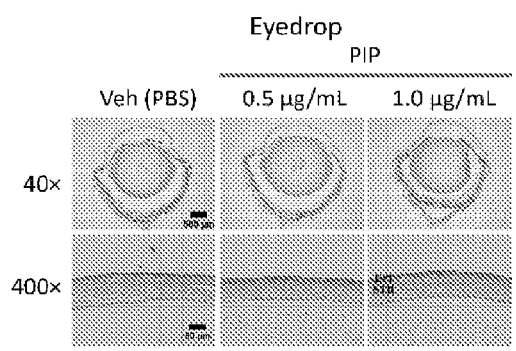
Figure 9B:
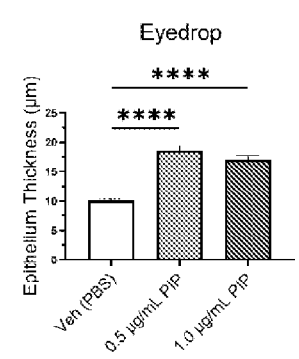
Figure 10A:
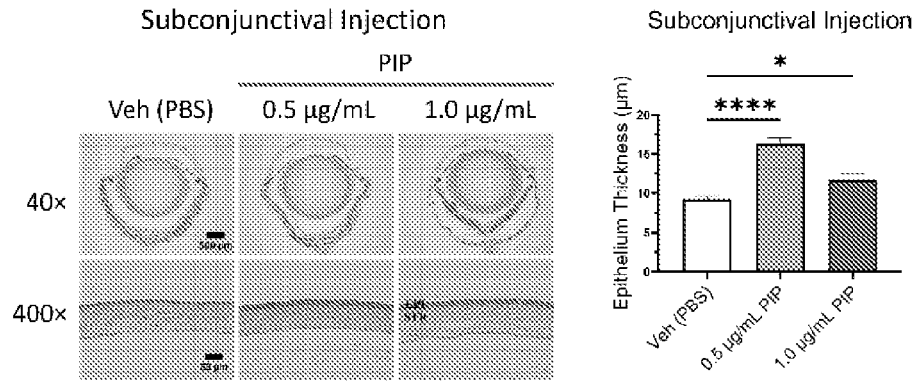
Figure 10A:
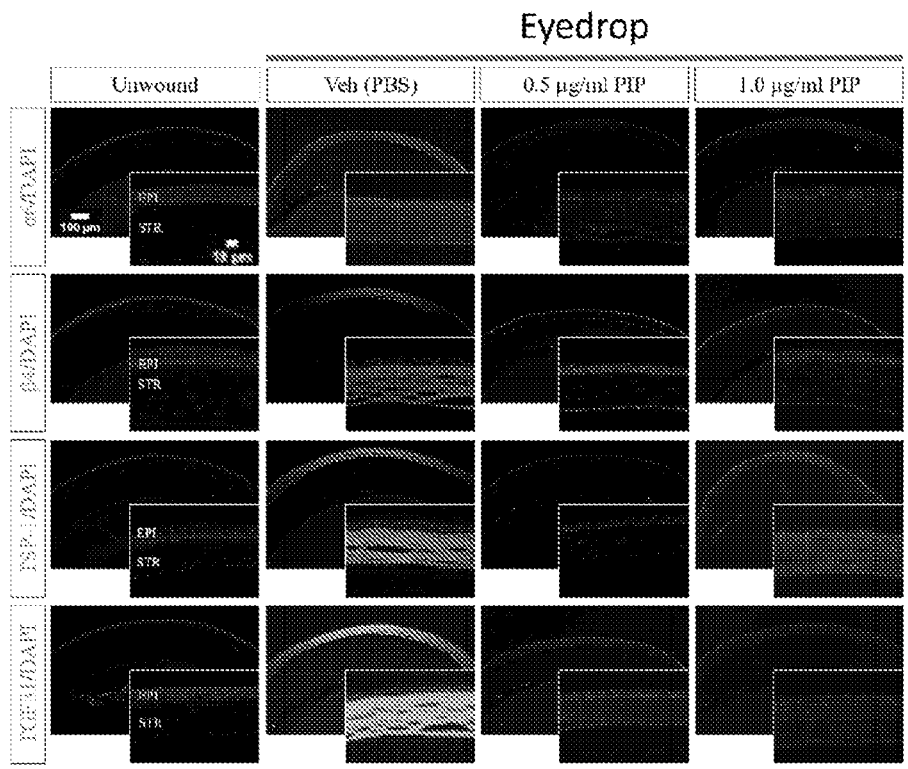
Figures 11B, 11C, 11D, 11E, 11F, 11G:
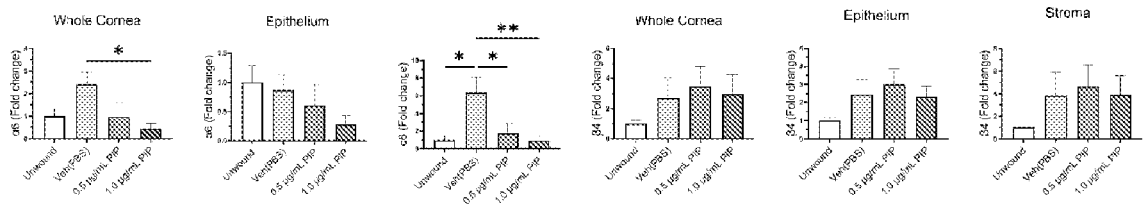
Figures 11H, 11I, 11J, 11K, 11L, 11M:
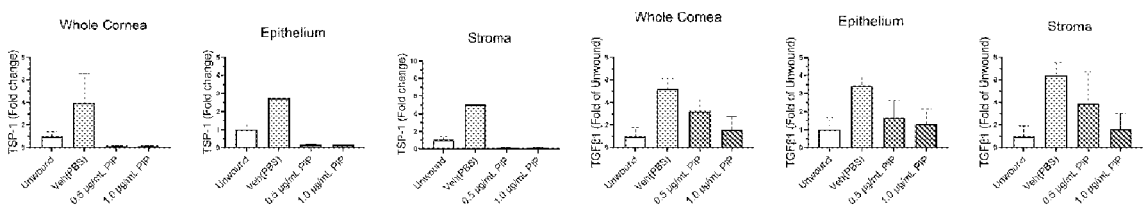

The injured corneas treated with PIP showed multi-layered, well-organized epithelium at 3 days. The mean corneal epithelial thickness in the eyedrop topical treatment groups at 3 days were 18.56±2.89 µm in the 0.5 µg/mL PIP group, 16.98±2.51 µm in the 1.0 µg/mL PIP group, compared with 10.10±1.13 µm in the control (FIGS. 9A and 9B). For those in subconjunctival injection groups at 3 days were 16.36±2.47 µm in the 0.5 µg/mL PIP group, 11.72±2.80 µm in the 1.0 µg/mL PIP group, compared with 9.24±1.49 µm in the control group (FIGS. 9C and 9D).

PIP eyedrop downregulated integrin α6, integrin β4, Thrombospondin-1, and TGF-β1 expression levels, in vivo.

It has been known that integrin α6, β4 and Thrombospondin-1 play important role in regulation of corneal wound healing [14-19]. Further, TGF-1 is known to stimulate scar formation in cornea [20, 21]. To study whether PIP regulates the expression of integrin α6, integrin β4, Thrombospondin-1 and TGF-β1 in the cornea, we performed the immunostaining of the wounded corneas at Day 4. As shown in FIG. 10A to 10M, integrin α6, integrin β4, Thrombospondin-1 and TGF-β1 levels were significantly lower in the PIP eyedrop treatment groups, when compared to controls. PIP subconjunctival injection decreased the expression of integrin α6 in stroma (FIGS. 11A to 11D). However, the expression changes of integrin β4, Thrombospondin-1 and TGF-β1 in the wounded cornea after PIP subconjunctival injection treatment were not significant (FIGS. 11E to 11M).

PIP accelerates HCEC migration, in vitro.

Figure 12A:
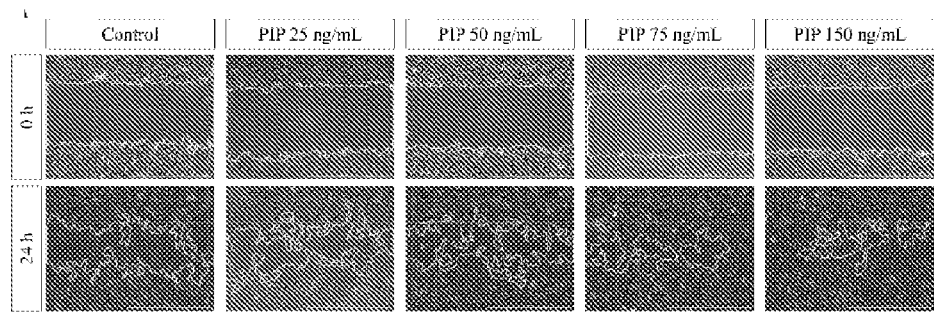
Figure 12B:
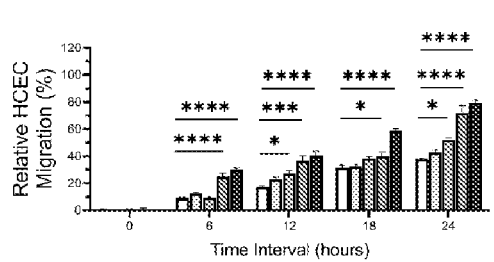
Figure 12C:
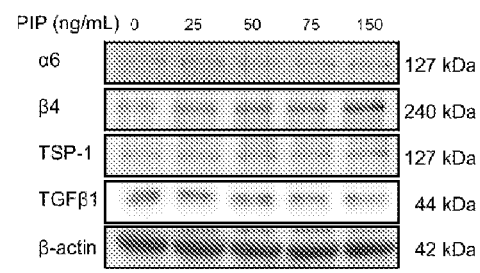

To determine the direct impact of PIP on migration of corneal epithelial cells, scratch assays were performed using HCECs seeded in six-well plates at 100% confluency. Scratches were performed using a sterile micropipette tip (time 0 h), and treated with 25 ng/ml, 50 ng/ml, 75 ng/mL, or 150 ng/mL PIP. Our results showed that in a concentration-dependent manner, PIP (75 ng/mL and 150 ng/mL) accelerated wound closure as early as 6 h (FIGS. 12A and 12B).

To study the regulatory effect of PIP on the expression of integrin α6, integrin β4, Thrombospondin-1, and TGF-β1 in the epithelial cells, we performed the western blot analysis. As shown in FIGS. 12C to 12F, integrin α6, integrin β4 and Thrombospondin-1 levels were significantly higher in the PIP treatment groups, when compared to controls. PIP treatment decreased the expression of TGF-β1 in epithelial cells at 150 ng/ml (FIG. 12G).

PIP accelerates HCF migration, in vitro.

To determine the direct impact of PIP on corneal stromal cells, we evaluated the migration of HCFs treated with 25 ng/mL, 75 ng/mL, or 150 ng/mL PIP. Cultures without PIP served as controls. As shown in FIG. 13, PIP (25 ng/mL and 150 ng/mL) stimulated HCFs migration as early as 6 h.

PIP downregulated protein expression of fibrotic markers, in vitro.

PIP exhibits anti-fibrotic potentiality by downregulating expression of TGF-β1 in HCECs. Using our established 3D self-assembled in vitro cell culture model, we investigated the impact of PIP on corneal fibrosis probing for corneal fibrotic markers: SMA and Col III. Our results showed that SMA was significantly upregulated at the two lowest PIP concentrations, but significantly downregulated at 150 ng/mL, when compared to a control (FIG. 14A). Col III was unaffected by the 25 and 75 ng/mL PIP stimulation but was significantly downregulated with 150 ng/ml (FIG. 14B), consistent with SMA modulation.

Using a mouse corneal epithelial debridement model, it was found that local administration of PIP enhanced recovery of corneal epithelial wound and restored the central corneal epithelial thickness, compared to the control group (treated with vehicle—PBS). Furthermore, the in vitro study showed that treatment of PIP promoted cellular migration in HCECs and HCFs.

The closure of corneal wound area requires a wide variety of cellular responses, including the attachment and migration of epithelial cells over a temporary matrix of fibrin and fibronectin [10]. Integrins are known to mediate cell-cell and cell-matrix adhesion [33, 34] It has been identified that integrin α6β4 is an important component of hemidesmosome involved in epithelial cell adhesion to the basement membrane [14, 15]. Further, it has been shown that Thrombospondin-1 greatly accelerates corneal wound closure and is considered a significant corneal wound healing modulator [17-19]. The in vitro studies herein show that PIP treatment largely increased the expression of integrin α6, β4 and Thrombospondin-1 in primary HCECs. The expression and persistence of integrin α6 and β4 in the cornea are linked to the extent of the wound healing [16], whereas Thrombospondin-1 gradually decreases after healing [17-19]. The in vivo studies showed that PIP eye drops effectively reduced integrin α6, β4 and Thrombospondin-1 expression in mice wounded cornea, which coincided with healthy re-epithelization.

The corneal wound healing cascade involves complex stromal-epithelial interactions [23]. The corneal stroma accounts for 90% of the corneal thickness and stromal keratocytes contribute to the maintenance of corneal transparency [35, 36]. One of the critical complications associated with corneal injury is scar formation by way of corneal fibrosis which may lead to corneal blindness, one of the top causes of vision loss worldwide [37]. Previously it has been reported that SMA and Col III expression levels reflect the activity and degree of corneal fibrosis [21, 38], many times driven by TGF-β1 which is known to stimulate overproduction of ECM components and promote scarring [20, 21].

The in vitro and in vivo studies herein showed significant downregulation of SMA, Col III, as well as TGF-β1, indicating that PIP presence is crucial during corneal wound healing. The in vivo studies utilized the epithelial debridement model, which allows targeted and reproducible epithelial disruption, leaving the other areas intact. Using the present invention, the anti-fibrotic effect of PIP using an incision-like corneal wound model can be measured.

There are three primary methods of delivery of ocular medications to the eye, which are topical, local ocular (i.e., subconjunctival, retrobulbar), and systemic [39, 40]. In this study, the inventors compared topical delivery (eyedrops) and conjunctival injections. Interestingly, the therapeutic effect of 1.0 µg/ml of PIP seemed less potent than 0.5 µg/ml. By way of explanation, but not a limitation of the present invention, it is possible this difference is due to drug osmolality and viscosity, which can affect the kinetics of corneal and conjunctival penetration of PIP. It also possible that this is a toxicity effect due to relatively high dose of PIP administration. However, the inventors did not observe any detectable side effects such as eye redness, discomfort, or tearing to the mice due to PIP administration. Also, no detectable damages were observed in the ocular histological analysis, suggesting local administration of PIP lacks severe toxicities at doses required for treatment. When compared to subconjunctival injections, PIP eyedrops showed a better overall therapeutic profile in the context of modulating corneal wound healing. Such findings are not surprising, given the location and depth of the wound (i.e., epithelial debridement). Clinically, eyedrops are far more convenient, non-invasive, and painless strategy for treating corneal wounds. The challenge with eyedrops is that drug penetration drops rapidly once the epithelium wound is closed or when established scars are formed. PIP can also be delivered to stromal incisions.

While eye drops are less invasive, compared to the subconjuctival injections, the possibility of administering a single conjunctival injection of an anti-fibrotic agent immediately post-trauma or post-surgery is clinically attractive. This is especially true for deeper stroma wounds/scars where reepithelization is completed and eye drop drug delivery can be extremely challenging. A modified eye drop composition and/or delivery can be used for deep-stroma scars.

Cell isolation and expansion. Primary fibroblasts from healthy human corneas (HCF) were isolated following the procedure previously described [12]. Briefly, the cornea was scraped with a razor blade to remove the epithelium and endothelium, leaving the stromal layer exposed. The stromal tissue was then cut into pieces (i.e. explants) of approximately 2 mm×2 mm, placed into a T25 flask and allowed to adhere to the bottom for 45 minutes at 37° C. with 5% carbon dioxide ($CO_2$). After that, Eagle's Minimum Essential Media (EMEM: ATCC: Manassas, VA) supplemented with 10% Fetal Bovine Serum (FBS: R&D Systems, Minneapolis, MN, USA) and 1% Antibiotic-Antimycotic solution (Gibco® Antibiotic-Antimycotic, Life technologies, Grand Island, NY) was added carefully to the flask to avoid explant detachment. Cells proliferating from the explants were treated with Trypsin-EDTA (Gibco® Trypsin-EDTA 0.05% phenol red, Life technologies, Grand Island, NY) for 6 minutes at 37° C. to promote detachment, followed by passage to T75 flasks and further expansion and/or freeze at −80° C. for later use.

2D cultures and scratch assay. Primary human cornea epithelial cells (HCEC) were purchased from ATCC (PCS-700-010) and cultured in Corneal Epithelial Cell Basal Medium (PCS-700-030 and PCS-700-040). HCECs and HCFs were plated in 6-well plates at a density of $1 \times 10^6$ cells/mL and left for 24 h at 37° C. with 5% $CO_2$ to reach 100% confluency. Cells were then treated with media alone (control group) or supplemented with various concentrations of PIP, and wounded across (scratch assay) the well using a sterile micropipette tip. Wound sites were monitored, imaged, and quantified at different time points.

3D in vitro model. HCFs were plated at a density of $1 \times 10^6$ cells/well in EMEM with 10% FBS and 1% Anti-biotic-Antimycotic, on transwell 6-well plates which contain a polycarbonate membrane insert with 0.4 μm pores (Costar, Charlotte, NC, USA). 1.5 mL of media containing the cells was placed on the top and another 1.5 mL of media-only was added to the bottom [12]. After 24 h, fresh media was provided and from then on, the media was supplemented with 0.5 mM 2-O-α-D-glucopyranosyl-L-ascorbic acid (VitC, Wako Chemicals USA, Inc.; Richmond, VA, USA) in order to provide the necessary environment for the cells to secrete and assemble their own ECM. Constructs were grown for 4 weeks at 37° C. with 5% $CO_2$, changing media every other day in the presence of PIP 25 ng/ml, 75 ng/ml, and 150 ng/mL, or VitC-only (control group).

Protein extraction and Western blots. Protein extraction was performed on all 3D constructs. At the end of each experiment (i.e., week 4), each well was washed twice with 1 mL of cold PBS. Inserts were then placed on wax paper and using sterile forceps, ECM constructs were carefully detached from their membranes and placed into a 1.5 mL tube containing 1×RIPA lysis buffer (50 mM Tris pH 8, 150 mM NaCl, 1% Triton X-100, and 0.1% SDS). Samples were incubated on ice for 30 minutes and centrifuged for 15 minutes (1000 rpm at 4° C.). The supernatant was transferred into a new tube for standard BCA (BCA Protein assay, Thermo Scientific™, Waltham, MA, USA) analysis, and western blots.

Western blots were performed to evaluate the protein expression of integrin α6 (abcam #181551, Cambridge, MA), integrin β4 (abcam #182120), TGF-β1 (abcam #215715), Thrombospondin-1 (TSP-1: abcam #267388), alpha-Smooth Muscle Actin (αSMA: abcam #ab5694) and Collagen Type III (Col III: abcam #ab7778) using GAPDH (abcam #ab9485) or β-actin (Sigma-Aldrich #A5441) as loading control. Samples were normalized and loaded in equal amounts in a 4-20% Tris-Glycine gel (Novex, Life technologies, Carlsbad, CA) and then transferred onto a PVDF membrane using the iBlot™ 2 transfer stack (Novex, Life technologies, Carlsbad, CA). Membranes were then incubated for 1 hour in 1× Fluorescent Blocking Buffer (Block-er™ FL, Thermo Scientific™, Waltham, MA, USA), followed by overnight incubation in the primary antibodies at 1:1000 dilution and 4° C. The following day, membranes were washed three times in TBST (10% Tris Buffer Saline, 1% Tween 20) for 5 minutes each time and incubated for 1 hour in the Alexafluor 568 goat anti-rabbit secondary antibody (Life Technologies, Grand Island, NY, USA) at 1:2000 dilution. Membranes were washed three more times in TBST, imaged and analyzed using iBright Analysis Software (Invitrogen, Life technologies, Carlsbad, CA).

Animals. The randomized, controlled, blinded animal experiments were approved by the Institutional Animal Care and Use Committee (IACUC) of OUHSC (protocol #18-067). C57BL/6J mice (16-week-old) were purchased from Jackson Laboratories (Bar Harbor, ME). All experiments were performed following the guidelines of the ARVO Statement for the Use of Animals in Ophthalmic and Vision Research and approved by the Institutional Animal Care and Use Committee of the University of Oklahoma Health Sciences Center. In all procedures, animals were anesthetized with i.p. injection of 50 mg/kg ketamine hydrochloride mixed with 5 mg/kg xylazine (Vedco, St. Joseph, MO).

Corneal epithelial debridement wound and grouping. The corneal epithelial debridement wounds were induced according to previously described protocols [13]. Briefly, after the mice were anesthetized, an Alger brush II Corneal Rust Ring Remover (Alloy Medical, San Mateo, CA) was used to remove the central corneal epithelial layer on both eyes with a diameter of 2-mm. Then the mice were randomly classified to 6 groups: vehicle (PBS) eyedrop, 0.5 μg/mL PIP eyedrop, 1.0 μg/mL PIP eyedrop, vehicle (PBS) subconjunctival injection, 0.5 μg/mL PIP subconjunctival injection, and 1.0 μg/mL PIP subconjunctival injection (10 mice in each group). The eyedrop or subconjunctival injection treatment (10 μL/eye) was performed daily for 4 days after the wound. The injured corneas were stained with 0.1% sodium fluorescein and photographed daily with Micron IV (Phoenix Technology Group, Pleasanton, CA). The injured area was imaged and quantified with Image J software (National Institutes of Health, Bethesda, MD).

Histological Examination. The eyeballs were surgically excised after the mice were euthanized by $CO_2$ overdose exposure and fixed in 4% paraformaldehyde (PFA). The tissue blocks were washed, dehydrated in graded ethanol, embedded in paraffin, cut at 5 μm thickness, mounted, and stained with hematoxylin and eosin (H&E). The representative sections per eye were examined and photographed with an Olympus microscope (Tokyo, Japan) equipped with a digital camera. The whole field at ×40 and ×400 magnification was examined on each cross-section and epithelial thickness was measured by Image J software.

Immunohistochemistry of mouse corneas. The mouse eyeballs were fixed in 4% PFA for 48 h for the paraffin section. Following the antigen retrieval with sodium citrate buffer (10 mM sodium citrate, 0.05% Tween 20, pH 6.0) in steam bath and blocking, the sections were incubated with the antibodies against integrin α6 (abcam #181551), integrin β4 (abcam #182120), TGF-β1 (abcam #215715), or Thrombospondin-1 (abcam #267388) overnight. After washed with PBS, the sections were incubated with Alexafluor 488 goat anti-rabbit IgG (Jackson ImmunoResearch #111-545-003) for 2 hours, then mounted with Vectashield mounting buffer containing DAPI (Vector Laboratories #H-1200) and photographed with Zeiss Microscope (Observer Z1, Pleasanton, CA).

Statistical analysis. GraphPad Prism 9 (GraphPad Software, Inc., La Jolla, CA) was used to perform the statistical analyses. Data were expressed as mean±SEM. The paired Student's t-test was used to compare differences between two groups. ANOVA was applied to compare three or more groups. A p-value less than 0.05 (p<0.05) was considered statistically significant.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

1. Barrientez, B., et al., *Corneal injury: Clinical and molecular aspects*. Exp Eye Res, 2019, 186: p. 107709.
2. Channa, R., et al., *Epidemiology of Eye-Related Emergency Department Visits*. JAMA Ophthalmol, 2016, 134 (3): p. 312-9.
3. Feizi, S., *Corneal endothelial cell dysfunction: etiologies and management*. Ther Adv Ophthalmol, 2018, 10: p. 2515841418815802.
4. Medeiros, C. S., et al., *The Corneal Basement Membranes and Stromal Fibrosis*. Invest Ophthalmol Vis Sci, 2018, 59(10): p. 4044-4053.
5. Mirels, L., A. R. Hand, and H. J. Branin, Expression of gross cystic disease fluid protein-15/Prolactin-inducible protein in rat salivary glands. J Histochem Cytochem, 1998. 46(9): p. 1061-71.
6. Sharif, R., et al., Prolactin-Induced Protein is a novel biomarker for Keratoconus. Exp Eye Res, 2019. 179: p. 55-63.
7. Urbaniak, A., et al., Prolactin-induced protein (PIP)—characterization and role in breast cancer progression. Am J Cancer Res, 2018. 8(11): p. 2150-2164.
8. Naderi, A. and M. Meyer, Prolactin-induced protein mediates cell invasion and regulates integrin signaling in estrogen receptor-negative breast cancer. Breast Cancer Res, 2012. 14(4): p. R111.
9. Er, H. and E. Uzmez, Effects of transforming growth factor-beta 2, interleukin 6 and fibronectin on corneal epithelial wound healing. Eur J Ophthalmol, 1998. 8(4): p. 224-9.
10. Phan, T. M., et al., Role of fibronectin and fibrinogen in healing of corneal epithelial scrape wounds. Invest Ophthalmol Vis Sci, 1989. 30(3): p. 377-85.
11. Caputo, E., et al., A novel aspartyl proteinase from apocrine epithelia and breast tumors. J Biol Chem, 2000. 275(11): p. 7935-41.
12. Karamichos, D., et al., *Novel in Vitro Model for Keratoconus Disease*. J Funct Biomater, 2012. 3(4): p. 760-775.
13. Kalha, S., A. Kuony, and F. Michon, Corneal Epithelial Abrasion with Ocular Burr As a Model for Cornea Wound Healing. J Vis Exp, 2018(137).
14. Stepp, M. A., *Corneal integrins and their functions*. Exp Eye Res, 2006. 83(1): p. 3-15.
15. Gipson, I. K., et al., Redistribution of the hemidesmosome components alpha 6 beta 4 integrin and bullous pemphigoid antigens during epithelial wound healing. Exp Cell Res, 1993. 207(1): p. 86-98.
16. Longmate, W. M. and C. M. Dipersio, *Integrin Regulation of Epidermal Functions in Wounds*. Adv Wound Care (New Rochelle). 2014. 3(3): p. 229-246.
17. Uno, K., et al., *Thrombospondin-1 accelerates wound healing of corneal epithelia*. Biochem Biophys Res Commun, 2004. 315(4): p. 928-34.
18. Blanco-Mezquita, J. T., A. E. Hutcheon. and J. D. Zieske, *Role of thrombospondin-1 in repair of penetrating corneal wounds*. Invest Ophthalmol Vis Sci, 2013. 54(9): p. 6262-8.
19. Matsuba, M., A. E. Hutcheon, and J. D. Zieske, *Localization of thrombospondin-1 and myofibroblasts during corneal wound repair*. Exp Eye Res, 2011. 93(4): p. 534-40.
20. Clark, R. A., et al., TGF-beta 1 stimulates cultured human fibroblasts to proliferate and produce tissue-like fibroplasia: a fibronectin matrix-dependent event. J Cell Physiol, 1997. 170(1): p. 69-80.
21. Karamichos, D., et al., *Human corneal fibrosis: an in vitro model*. Invest Ophthalmol Vis Sci, 2010. 51(3): p. 1382-8.
22. Sugioka. K., et al., The fibrinolytic system in the cornea: A key regulator of corneal wound healing and biological defense. Exp Eye Res, 2021. 204: p. 108459.
23. Wilson, S. E., et al., The corneal wound healing response: cytokine-mediated interaction of the epithelium, stroma, and inflammatory cells. Prog Retin Eye Res, 2001. 20(5): p. 625-37.
24. Di Girolamo, N., Moving epithelia: Tracking the fate of mammalian limbal epithelial stem cells. Prog Retin Eye Res, 2015. 48: p. 203-25.
25. Zieske, J. D., S. R. Guimaraes, and A. E. Hutcheon, *Kinetics of keratocyte proliferation in response to epithelial debridement*. Exp Eye Res, 2001. 72(1): p. 33-9.
26. Ruberti, J. W. and J. D. Zieske, Prelude to corneal tissue engineering—gaining control of collagen organization. Prog Retin Eye Res, 2008. 27(5): p. 549-77.
27. Kuo, I. C., *Corneal wound healing*. Curr Opin Ophthalmol, 2004. 15(4): p. 311-5.
28. Velnar, T., T. Bailey, and V. Smrkolj, *The wound healing process: an overview of the cellular and molecular mechanisms*. J Int Med Res, 2009. 37(5): p. 1528-42.
29. Han, K. Y., et al., Potential role of corneal epithelial cell-derived exosomes in corneal wound healing and neovascularization. Sci Rep, 2017. 7: p. 40548.
30. Yu, F. S., et al., *Growth factors and corneal epithelial wound healing*. Brain Res Bull, 2010. 81(2-3): p. 229-35.
31. Hassan, M. I., et al., Prolactin inducible protein in cancer, fertility and immunoregulation: structure, function and its clinical implications. Cell Mol Life Sci, 2009. 66(3): p. 447-59.
32. Priyadarsini, S., et al., Gross cystic disease fluid protein-15/prolactin-inducible protein as a biomarker for keratoconus disease. PLoS One, 2014. 9(11): p. e113310.
33. Ruoslahti, E. and M. D. Pierschbacher. *New perspectives in cell adhesion: RGD and integrins*. Science, 1987. 238(4826): p. 491-7.
34. Hynes, R. O., *Integrins: a family of cell surface receptors*. Cell, 1987. 48(4): p. 549-54.
35. Reinstein, D. Z., et al., Stromal thickness in the normal cornea: three-dimensional display with artemis very high-frequency digital ultrasound. J Refract Surg, 2009. 25(9): p. 776-86.
36. Qazi, Y., et al., *Corneal transparency: genesis, maintenance and dysfunction*. Brain Res Bull, 2010. 81(2-3): p. 198-210.
37. Wilson, S. L., A. J. El Haj, and Y. Yang, Control of scar tissue formation in the cornea: strategies in clinical and corneal tissue engineering. J Funct Biomater, 2012. 3(3): p. 642-87.

38. Rao. K. B., et al., Evaluation of myofibroblasts by expression of alpha smooth muscle actin: a marker in fibrosis, dysplasia and carcinoma. J Clin Diagn Res, 2014. 8(4): p. ZC14-7.
39. Patel, A., et al., *Ocular drug delivery systems: An overview*. World J Pharmacol, 2013. 2(2): p. 47-64.
40. Gote, V., et al., *Ocular Drug Delivery: Present Innovations and Future Challenges*. J Pharmacol Exp Ther, 2019. 370(3): p. 602-624.

What is claimed is:

1. A method of treating ocular fibrosis of the eye in a human subject, the method comprising administering to the human subject in need of treatment a therapeutically effective amount of a prolactin-Inducible Protein (PIP) that inhibits or reverses the ocular fibrosis.

2. The method of claim 1, wherein the ocular fibrosis is selected from the group consisting of Grave's ophthalmopathy, epiretinal fibrosis, retinal fibrosis, subretinal fibrosis, subretinal fibrosis associated with macular degeneration, subretinal fibrosis associated with wet macular degeneration, diabetic retinopathy, glaucoma, corneal fibrosis, post-surgical fibrosis, fibrosis from cataract surgery, fibrosis from trabeculectomy for glaucoma, conjunctival fibrosis, and subconjunctival fibrosis.

3. The method of claim 1, wherein administering PIP is orally, topically, intraocularly, intravitreally, subcutaneously, subconjunctivally, intramuscularly, via eye drops, or via an implant.

4. The method of claim 1, wherein the human subject has downregulated PIP mRNA expression.

5. The method of claim 1, wherein the human subject has upregulated expression of at least one of TGF-$\beta$1, TGF-$\beta$2, TGF-$\beta$3, integrin $\alpha$6, integrin $\beta$4, or thrombospondin-1.

6. The method of claim 1, further comprising determining whether PIP is upregulated in the human subject, determining whether at least one of TGF-$\beta$1, TGF-$\beta$2, TGF-$\beta$3, integrin $\alpha$6, integrin $\beta$4, or thrombospondin-1 is upregulated in the human subject, and administering PIP if at least one of TGF-$\beta$1, TGF-$\beta$2, TGF-$\beta$3, integrin $\alpha$6, integrin $\beta$4, or thrombospondin-1 is upregulated in the human subject.

7. The method of claim 1, wherein the human subject has downregulated expression of PIP mRNA, but PIP protein expression is not reduced.

8. The method of claim 1, wherein the ocular fibrosis is caused by a trauma or injury selected from the group consisting of burns, cuts, stabs, scrapes, punctures, penetrations, dystrophies, and blunt trauma.

9. A method of treating ocular fibrosis in a human subject, the method comprising administering to the human subject in need of treatment a therapeutically effective amount of a prolactin-inducible protein (PIP) sufficient to inhibit or reverse the ocular fibrosis wherein the ocular fibrosis is selected from the group consisting of: Grave's ophthalmopathy, epiretinal fibrosis, retinal fibrosis, subretinal fibrosis, subretinal fibrosis associated with macular degeneration, subretinal fibrosis associated with wet macular degeneration, diabetic retinopathy, glaucoma, corneal fibrosis, post-surgical fibrosis, fibrosis from cataract surgery, fibrosis from trabeculectomy for glaucoma, conjunctival fibrosis, and subconjunctival fibrosis.

10. The method of claim 9, wherein administering PIP is orally, topically, intraocularly, intravitreally, subcutaneously, subconjunctivally, intramuscularly, via eye drops, or via an implant.

11. The method of claim 9, wherein the human subject has downregulated PIP mRNA expression.

12. The method of claim 9, wherein the human subject has upregulated expression of at least one of TGF-$\beta$1, TGF-$\beta$2, TGF-$\beta$3, integrin $\alpha$6, integrin $\beta$4, or thrombospondin-1.

13. The method of claim 9, further comprising determining whether PIP is upregulated in the human subject, determining whether at least one of TGF-$\beta$1, TGF-$\beta$2, TGF-$\beta$3, integrin $\alpha$6, integrin $\beta$4, or thrombospondin-1 is upregulated in the human subject, and administering PIP if at least one of TGF-$\beta$1, TGF-$\beta$2, TGF-$\beta$3, integrin $\alpha$6, integrin $\beta$4, or thrombospondin-1 is upregulated in the human subject.

14. The method of claim 9, wherein the human subject has downregulated expression of PIP mRNA, but PIP protein expression is not reduced.

15. The method of claim 9, wherein the ocular fibrosis is caused by a trauma or injury selected from the group consisting of burns, cuts, stabs, scrapes, punctures, penetrations, dystrophies, and blunt trauma.

\* \* \* \* \*